United States Patent
Motoyama et al.

(10) Patent No.: US 8,355,145 B2
(45) Date of Patent: Jan. 15, 2013

(54) IMAGE FORMING APPARATUS AND CONTROL METHOD FOR THE SAME

(75) Inventors: Eiichi Motoyama, Shinjuku-ku (JP); Junichi Into, Shibuya-ku (JP); Toshihiko Kitahara, Koto-ku (JP); Masao Watanabe, Toride (JP); Tsunao Hombo, Chuo-ku (JP); Akihiko Sakai, Abiko (JP); Masatoshi Yaginuma, Toride (JP)

(73) Assignee: Canon Kabushiki Kaisha (JP)

(*) Notice: Subject to any disclaimer, the term of this patent is extended or adjusted under 35 U.S.C. 154(b) by 154 days.

(21) Appl. No.: 11/377,882

(22) Filed: Mar. 16, 2006

(65) Prior Publication Data

US 2006/0209341 A1    Sep. 21, 2006

(30) Foreign Application Priority Data

Mar. 18, 2005    (JP) .................................. 2005-080495

(51) Int. Cl.
*G06K 15/00* (2006.01)

(52) U.S. Cl. ...................... 358/1.14; 358/1.13; 358/1.15; 358/1.16

(58) Field of Classification Search .................. 358/518, 358/296, 1.9, 3.03, 1.13–1.16; 399/32, 1, 399/31, 11, 9, 49; 386/83; 714/37, 23, 100; 717/144, 103; 706/52; 705/44; 719/318; 718/104; 711/147
See application file for complete search history.

(56) References Cited

U.S. PATENT DOCUMENTS

| | | | | |
|---|---|---|---|---|
| 3,913,070 A * | 10/1975 | Malcolm et al. | ............. | 718/104 |
| 4,179,732 A * | 12/1979 | Khan et al. | ................... | 358/1.16 |
| 4,811,051 A * | 3/1989 | Masuda et al. | ................. | 399/32 |
| 4,941,038 A * | 7/1990 | Walowit | ........................ | 358/518 |
| 4,952,988 A * | 8/1990 | Furuichi et al. | .................. | 399/1 |
| 4,980,780 A * | 12/1990 | Tanaka | .......................... | 358/401 |
| 5,028,953 A * | 7/1991 | Katoh et al. | ................. | 355/403 |
| 5,130,805 A * | 7/1992 | Rikima | ......................... | 358/296 |
| 5,138,376 A * | 8/1992 | Maruta et al. | ..................... | 399/9 |
| 5,164,770 A * | 11/1992 | Furuichi et al. | ................. | 399/11 |
| 5,481,335 A * | 1/1996 | Furuichi et al. | ................. | 399/9 |
| 5,561,500 A * | 10/1996 | Ohzeki et al. | .................. | 399/85 |
| 5,596,416 A * | 1/1997 | Barry et al. | ................... | 358/296 |

(Continued)

FOREIGN PATENT DOCUMENTS

JP    5-318819 A    12/1993

(Continued)

*Primary Examiner* — King Poon
*Assistant Examiner* — Jonathan Beckley
(74) *Attorney, Agent, or Firm* — Rossi, Kimms & McDowell LLP

(57) ABSTRACT

The image forming apparatus includes, even when an abnormality of operation occurs in any of a plurality of modules to which an assigned operation in a plurality of operations for an image formation is assigned and which autonomously executes the assigned operation, each of the modules can autonomously perform a particular operation for eliminating an abnormality of operation at a module in which an abnormality occurs. When detecting the module in which the abnormality of operation occurs based on operation abnormality generation condition information in each of the modules stored in the shared data module, the plurality of modules provided in the image forming apparatus each perform an operation (a particular operation) for eliminating the abnormality of operation in accordance with the module in which the abnormality of operation occurs and the contents of the abnormality of operation. Of the plurality of modules, a module which finally performs the particular operation notifies the occurrence of abnormality of operation to a controller module.

3 Claims, 16 Drawing Sheets

U.S. PATENT DOCUMENTS

| | | | |
|---|---|---|---|
| 5,720,014 A * | 2/1998 | Ikeda et al. | 358/1.15 |
| 5,732,162 A * | 3/1998 | Curry | 382/294 |
| 5,760,928 A * | 6/1998 | Motoyama et al. | 358/501 |
| 5,819,034 A * | 10/1998 | Joseph et al. | 709/201 |
| 5,860,038 A * | 1/1999 | Kato et al. | 399/49 |
| 5,914,538 A | 6/1999 | Kurosawa et al. | |
| 6,028,675 A * | 2/2000 | Fields et al. | 358/1.14 |
| 6,226,095 B1 * | 5/2001 | Fukuta | 358/1.13 |
| 6,249,658 B1 * | 6/2001 | Inui et al. | 399/82 |
| 6,307,615 B1 * | 10/2001 | Ito | 355/40 |
| 6,535,865 B1 * | 3/2003 | Skaaning et al. | 706/52 |
| 6,614,545 B1 * | 9/2003 | Langer et al. | 358/1.15 |
| 6,679,637 B2 * | 1/2004 | Tsuruta et al. | 400/120.01 |
| 6,763,336 B1 * | 7/2004 | Kolls | 705/44 |
| 7,034,954 B1 * | 4/2006 | Utsunomiya | 358/1.16 |
| 7,174,264 B2 * | 2/2007 | Yasukawa et al. | 702/115 |
| 7,260,336 B2 * | 8/2007 | Shimura et al. | 399/49 |
| 7,269,757 B2 * | 9/2007 | Lieblich et al. | 714/37 |
| 7,275,009 B2 * | 9/2007 | Yasukawa et al. | 702/115 |
| 7,324,909 B2 * | 1/2008 | Yasukawa et al. | 702/115 |
| 7,327,488 B2 * | 2/2008 | Kawaura | 358/1.16 |
| 7,411,694 B2 * | 8/2008 | Nomizu | 358/1.16 |
| 7,436,550 B2 * | 10/2008 | Aoki et al. | 358/3.03 |
| 7,463,373 B2 * | 12/2008 | Lapstun et al. | 358/1.1 |
| 7,480,083 B2 * | 1/2009 | Takahashi et al. | 358/474 |
| 2002/0149640 A1 | 10/2002 | Gomez et al. | |
| 2003/0018829 A1 | 1/2003 | Carney et al. | |
| 2004/0139385 A1 | 7/2004 | Sakaue | |
| 2004/0252324 A1 * | 12/2004 | Ohta | 358/1.14 |
| 2005/0088700 A1 * | 4/2005 | Aoki et al. | 358/3.03 |
| 2005/0141030 A1 * | 6/2005 | Tuchitoi et al. | 358/1.16 |
| 2005/0174597 A1 * | 8/2005 | Ikeda | 358/1.14 |
| 2005/0262394 A1 * | 11/2005 | Yasukawa et al. | 714/23 |
| 2005/0281596 A1 * | 12/2005 | Nakagawa et al. | 399/350 |
| 2005/0289559 A1 * | 12/2005 | Illowsky et al. | 719/318 |
| 2006/0020912 A1 * | 1/2006 | Illowsky et al. | 717/103 |
| 2006/0206882 A1 * | 9/2006 | Illowsky et al. | 717/144 |
| 2006/0209341 A1 * | 9/2006 | Motoyama et al. | 358/1.15 |
| 2006/0209352 A1 * | 9/2006 | Motoyama | 358/296 |
| 2006/0215215 A1 * | 9/2006 | Kumaran | 358/1.15 |
| 2007/0086037 A1 | 4/2007 | Kitahara et al. | |

FOREIGN PATENT DOCUMENTS

| | | |
|---|---|---|
| JP | 6-245021 A | 9/1994 |
| JP | 9-016035 A | 1/1997 |

* cited by examiner

FIG. 11

CONVEYANCE MODULE

| OCCURRED ABNORMALITY | PROCESSING | WHETHER OR NOT THE ACTION OF THE CONVEYANCE MODULE IS THE LAST ACTION OF AN IMAGE FORMATION |
|---|---|---|
| DELAY JAM | IMMEDIATE STOP | NO |
| ACCUMULATED JAM | IMMEDIATE STOP | NO |
| PAPER TYPE DIFFERENCE (UNACCEPTABLE) | IMMEDIATE STOP | NO |

FIG. 13

| FIXING MODULE WITH AN OCCURRENCE OF ABNORMAL | OCCURRED ABNORMALITY | PROCESSING | WHETHER OR NOT THE ACTION OF THE FIXING MODULE IS THE LAST ACTION OF AN IMAGE FORMATION |
|---|---|---|---|
| PAPER FEEDING | PAPER FEEDING DELAY JAM | STOP AFTER COMPLETION OF OPERATION | NO |
|  | ACCUMULATED JAM | STOP AFTER COMPLETION OF OPERATION | NO |
|  | SIZE NONCONFORMITY | STOP AFTER COMPLETION OF OPERATION | NO |
| CONVEYANCE | DELAY JAM | STOP AFTER COMPLETION OF OPERATION | NO |
|  | ACCUMULATED JAM | STOP AFTER COMPLETION OF OPERATION | NO |
|  | PAPER TYPE DIFFERENCE (UNACCEPTABLE) | STOP AFTER COMPLETION OF OPERATION | NO |
| FIXING | DELAY JAM | - | NO |
|  | ACCUMULATED JAM | - | YES |
| PAPER DISCHARGE | DELAY JAM | IMMEDIATE STOP | YES |
|  | ACCUMULATED JAM | IMMEDIATE STOP | YES |

FIG. 15

PAPER DISCHARGE MODULE

| MODULE WITH AN OCCURRENCE OF ABNORMAL | OCCURRED ABNORMALITY | PROCESSING | WHETHER OR NOT THE ACTION OF THE FIXING MODULE IS THE LAST ACTION OF AN IMAGE FORMATION |
|---|---|---|---|
| PAPER FEEDING | PAPER FEEDING DELAY JAM | STOP AFTER COMPLETION OF OPERATION | YES |
| | ACCUMULATED JAM | STOP AFTER COMPLETION OF OPERATION | YES |
| | SIZE NONCONFORMITY | STOP AFTER COMPLETION OF OPERATION | YES |
| CONVEYANCE | DELAY JAM | STOP AFTER COMPLETION OF OPERATION | YES |
| | ACCUMULATED JAM | STOP AFTER COMPLETION OF OPERATION | YES |
| | PAPER TYPE DIFFERENCE (UNACCEPTABLE) | STOP AFTER COMPLETION OF OPERATION | YES |
| FIXING | DELAY JAM | STOP AFTER COMPLETION OF OPERATION | YES |
| | ACCUMULATED JAM | IMMEDIATE STOP | NO |
| PAPER DISCHARGE | DELAY JAM | - | NO |
| | ACCUMULATED JAM | - | NO |

IMAGE FORMING APPARATUS AND CONTROL METHOD FOR THE SAME

BACKGROUND OF THE INVENTION

1. Field of the Invention

The present invention relates to an image forming apparatus for forming an image on a sheet, and to a control method for the same. In particular, the present invention relates to an image forming apparatus including a plurality of modules each autonomously performing a particular operation; and to a control method for the same.

2. Related Background Art

Conventionally, an image forming apparatus is provided with a control device called as a DC controller, and the DC controller intensively performs control associated with an image formation. The image forming apparatus including the DC controller is disclosed in, for example, Japanese Patent Application Laid-open No. H05-318819.

However, in the conventional image forming apparatus, since control is intensively performed by a DC controller, load on hardware and software is increased in the DC controller. As a result, as the image forming apparatus becomes larger in size or more advanced, the load on the DC controller is even more increased.

SUMMARY OF THE INVENTION

An object of the present invention is to provide an image forming apparatus in which, even when an abnormality of operation occurs in any of a plurality of modules each of which autonomously executes an assigned operation so as to cooperate with each other to thereby perform an image formation, each of the modules can autonomously perform a particular operation for eliminating the abnormality of operation at the module in which an abnormality occurs.

Another object of the present invention is to provide an image forming apparatus in which an image is formed by a plurality of operations, including a plurality of modules to which an assigned operation in a plurality of operations is assigned, and which autonomously performs the assigned operation; a shared data storing device for updatably storing at least operation condition information of each of the plurality of modules, the operation condition information being shared by the plurality of modules to be availably connected, in which: the plurality of modules executes the assigned operation by referring to the operation condition information stored in the shared data storing device; each of the plurality of modules performs, in a case where each of the plurality of modules detects an occurrence of abnormality of operation based on the operation condition information stored in the shared data storing device, a particular operation for eliminating the occurrence of abnormality different from the assigned operation in the module in which the abnormality occurs; and of the plurality of modules, a module which finally performs the particular operation notifies the occurrence of abnormality of operation to the outside.

Another object of the present invention is to provide an image forming apparatus in which an image is formed by a plurality of operations, including a plurality of modules to which an assigned operation in the plurality of operations is assigned, and which autonomously performs the assigned operation, the each of the modules performing the assigned operation based on received operation condition information while transmitting/receiving operation condition information to/from at least one corresponding module, in which: when an abnormality of operation occurs in any of the plurality of modules, the module in which an abnormality of operation occurs notifies all the corresponding modules of the occurrence of abnormality of operation; the modules in which the abnormality of operation occurs and all the modules notified of the occurrence of abnormality of operation each perform a particular operation for eliminating an abnormality of operation at the module in which the abnormality of operation occurs; and of the plurality of modules, a module which finally performs the particular operation notifies the occurrence of abnormality of operation to the outside.

A further object of the present invention is to provide a control method for the image forming apparatus in which an image is formed by a plurality of operations, the image forming apparatus including: a plurality of modules to which an assigned operation in the plurality of operations is assigned, and which autonomously performs the assigned operation; a shared data storing device for updatably storing at least operation condition information of each of the plurality of modules, the operation condition information being shared by the plurality of modules to be availably connected, the control method including the steps of: causing each of the plurality of modules to perform a particular operation for eliminating the occurrence of abnormality different from the assigned operation in the module in which the abnormality occurs in a case where each of the plurality of modules detects an occurrence of abnormality of operation based on the operation condition information stored in the shared data storing device; and causing, of the plurality of modules, a module which finally performs the particular operation to notify the occurrence of abnormality of operation to the outside.

A still further object of the present invention is to provide a control method for the image forming apparatus, including a plurality of modules to which an assigned operation in the plurality of operations is assigned, and which autonomously performs the assigned operation, the each of the modules performing the assigned operation based on received operation condition information while transmitting/receiving operation condition information to/from at least one corresponding module, the control method including: a first notification step of notifying the occurrence of abnormality of operation from the module in which the abnormality of operation occurs to all the corresponding modules when the abnormality of operation occurs in any of the plurality of modules; a particular operation step of performing a particular operation for eliminating an abnormality of operation at the module in which the abnormality of operation occurs by the modules in which the abnormality of operation occurs and all the modules notified of the occurrence of abnormality of operation; and a second notification step of notifying the occurrence of abnormality of operation to the outside by the module of the plurality of modules, which finally performs the particular operation.

The other objects and features of the present invention will be apparent from the following description and the accompanying drawings.

BRIEF DESCRIPTION OF THE DRAWINGS

FIG. 11 is a diagram showing an example of a table used when processing to be executed in step S2 of FIG. 10 is determined;

FIG. 13 is a diagram showing an example of a table used when processing to be executed in step S12 of FIG. 12 is determined;

FIG. 15 is a diagram showing an example of a table used when processing to be executed in step S22 of FIG. 14 is determined.

DESCRIPTION OF THE PREFERRED EMBODIMENTS

Hereinafter, embodiments of the present invention will be described with reference to the drawings.

First Embodiment

Figure 1:
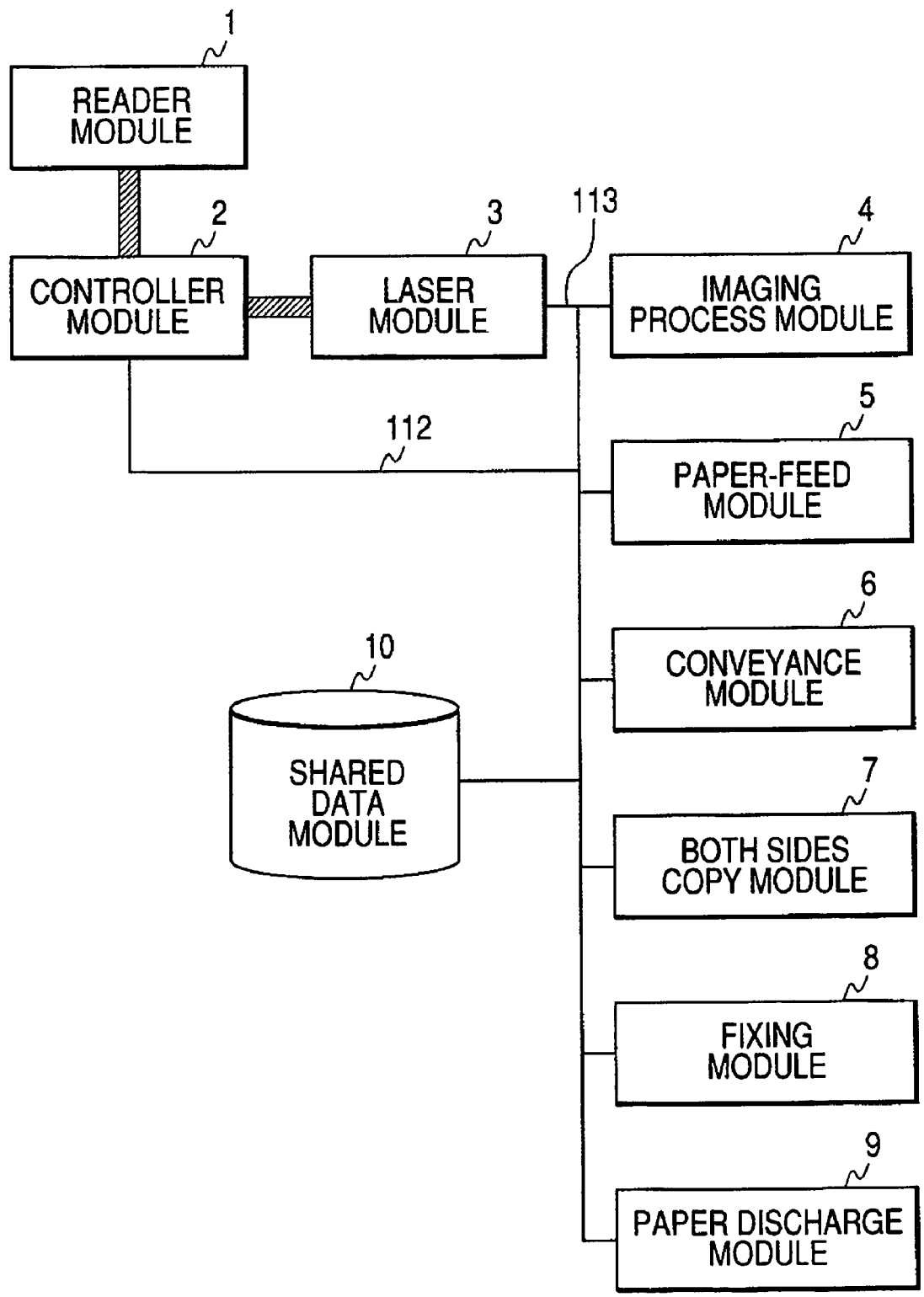
FIG. 1 is a block diagram showing a structure of an image forming apparatus according to a first embodiment of the present invention.
Figure 2:
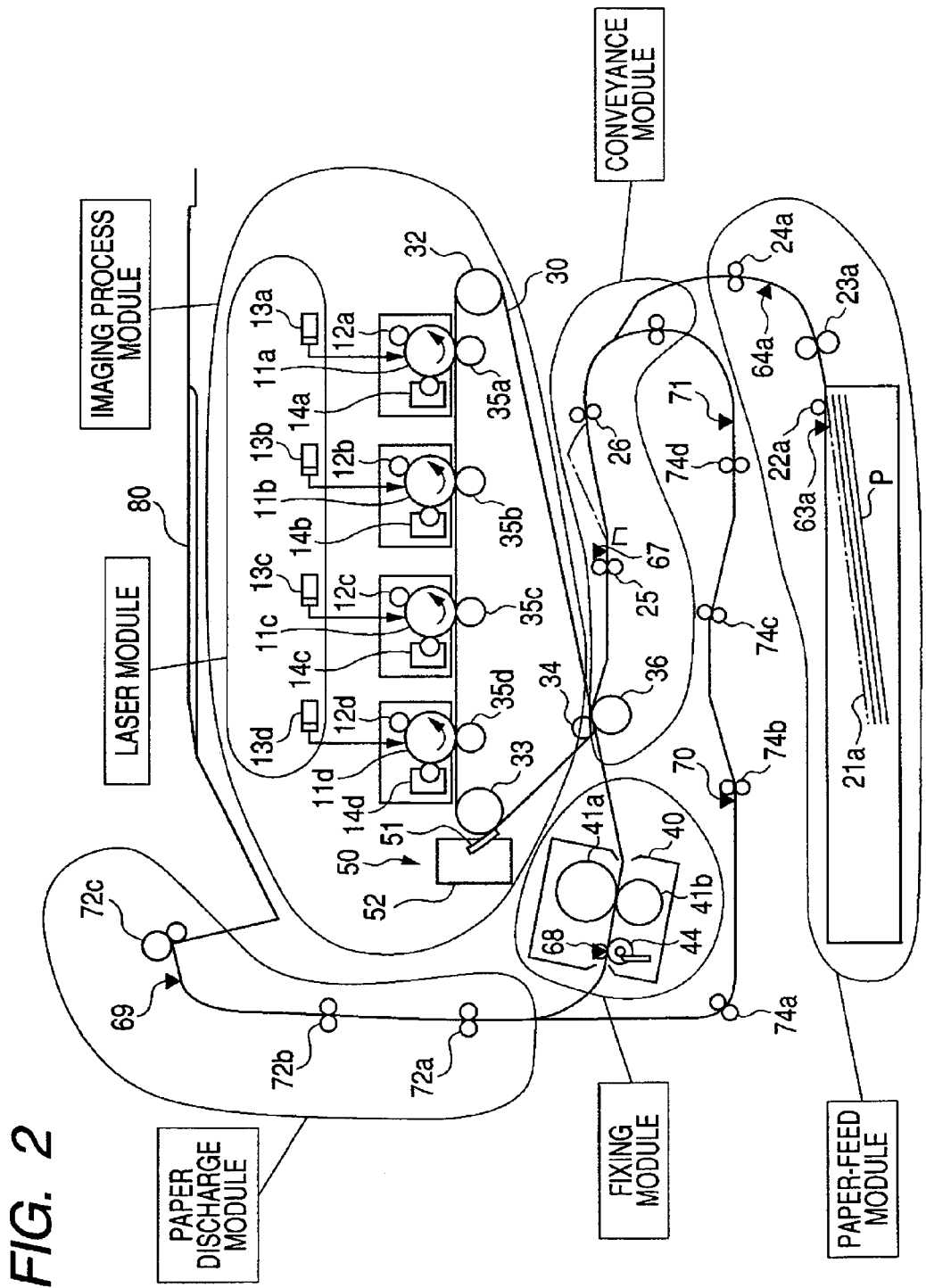
FIG. 2 is a diagram schematically showing an operation unit included in each of modules constituting a printer part of the image forming apparatus shown in FIG. 1.

FIG. 1 is a block diagram showing a structure of an image forming apparatus according to a first embodiment of the present invention. FIG. 2 is a diagram schematically showing an operation unit included in each of the modules constituting a printer part of the image forming apparatus shown in FIG. 1.

As shown in FIG. 1, the image forming apparatus includes a reader module 1, a controller module 2, and a plurality of modules 3 to 10 for constituting a printer part.

To be more specific, the reader module 1 includes a reader part (not shown) for reading an original, and outputs image data read from the reader part. The controller module 2 has an image processing function for subjecting a predetermined image processing to image data outputted from the reader module 1 or image data received, for example, from a personal computer through an interface (not shown), a function for setting an operation mode inputted from a operation part (not shown), a function for displaying information on the operation part, or the like.

The printer part is provided with a laser module 3, an imaging process module 4, a paper-feed module 5, a conveyance module 6, a both sides copy module 7, a fixing module 8, a paper discharge module 9, and a shared data module 10. Each of the aforementioned modules 3 to 9 includes a driving part such as a driving motor, a sensor, a driving circuit, a processing circuit, or an operation unit formed by a combination thereof. Each of the modules 3 to 9 autonomously performs a particular operation by controlling an operation of the operation unit which included in itself while referring to information stored in the shared data module 10. In this case, the particular operation is the assigned operation which is assigned to the laser module 3, the imaging process module 4, the paper-feed module 5, the conveyance module 6, the both sides copy module 7, the fixing module 8, the paper discharge module 9, and the shared data module 10, respectively.

The laser module 3 includes a laser scanner unit (an operation unit) and controls an operation of the laser scanner unit. Thus, a laser beam modulated based on image data is emitted from the laser scanner unit and the laser beam is irradiated on a photosensitive drum while being scanned in a main scanning direction (exposure scanning). Through the exposure scanning, an electrostatic latent image is formed on the photosensitive drum.

To be more specific, as shown in FIG. 2, the laser scanner unit includes scanners 13a to 13d which correspond to yellow, cyan, magenta, and black, respectively. The scanners 13a to 13d each include a laser emitting part (not shown) for modulating a laser beam based on the image data to be outputted and a exposure scanning part for irradiating a laser beam outputted from the laser emitting part to photosensitive drums 11a to 11d while scanning it in a main scanning direction using a polygon mirror. In this case, the photosensitive drum 11d is positioned at the most upstream side, and an electrostatic latent image is formed on the photosensitive drum 11d, the photosensitive drum 11c, the photosensitive drum 11b, and the photosensitive drum 11a in the stated order.

The imaging process module 4 executes the charging process, a developing process, a primary transfer process, and a secondary transfer process. To be more specific, the charging process is, as shown in FIG. 2, a process in which roller charging devices 12a to 12d uniformly give a charge on surfaces of the corresponding photosensitive drums 11a to 11d by roller charging devices 12a to 12d. The developing process is a process in which developing parts 14a to 14d form the electrostatic latent images formed on the photosensitive drums 11a to 11d into visible images as toner images.

The primary transfer process is a process in which an intermediate transferring belt 30 and primary transfer rollers 35a to 35d superpose the toner images formed on the photosensitive drums 11a to 11d in order and transfer the superposed toner images to the intermediate transferring belt 30. The intermediate transferring belt 30 is a belt which is formed of, for example, polyethylene terephthalate [PET], polyvinylidene difluoride [PVDF], or the like and extends between a driving roller 32, a tension roller 33, and a driven roller 34. The driving roller 32 is driven by a stepping motor (not shown) and drives the intermediate transferring belt 30. The driving roller 32 is formed of a metal roller a surface of which is coated with rubber with a thickness of a few millimeters. The rubber prevents a slip between the driving roller 32 and the intermediate transferring belt 30 from occurring. The tension roller 33 is energized by a spring (not shown) and gives a moderate tension to the intermediate transferring belt 30. The primary transfer rollers 35a to 35d are respectively arranged at a position opposed to the corresponding photosensitive drums 11a to 11d through the intermediate transferring belt 30. In addition, high voltage, which is required for transferring the toner images formed on the corresponding photosensitive drums 11a to 11d to the intermediate transferring belt 30, is applied to the primary transfer rollers 35a to 35d, respectively.

The secondary transfer process is a process in which the toner image carried on the intermediate transferring belt 30 is transferred on the paper fed from a paper-feed cassette 21a (described below) by applying a high voltage to a secondary transfer roller 36. The secondary transfer roller 36 is arranged at a position opposed to the driven roller 34 through the intermediate transferring belt 30. After the toner image on the intermediate transferring belt 30 is transferred on paper P, toner may be left on an image transfer surface of the intermediate transferring belt 30. Therefore, a cleaning device 50 is provided at a downstream side of the intermediate transferring belt 30. The cleaning device 50 is brought into contact with the image transfer surface of the intermediate transferring belt 30, and is constituted by a cleaner belt 51 formed of a polyurethane rubber material and a waste toner box 52 for containing toner collected by the cleaner belt 51.

The paper-feed module 5 controls driving of a pickup roller 22a, a paper-feed roller (a separation roller) 23a, and a drawing roller 24a, and feeds the paper P held in the paper-feed cassette 21a one by one. In the paper feeding of the paper P, the paper P is first sent from the paper-feed cassette 21a by the pickup roller 22a, and then the sent paper P is conveyed to a registration roller 25 (described below) before passing through a paper-feed roller 23a and the drawing roller 24a. In the paper-feed system for feeding the paper P, there are provided a sensor 63a for detecting a presence or absence of paper in the paper-feed cassette 21a and a sensor 64a for detecting a passage of the paper P. Then, a success or failure of pick-up of the paper P and a paper-feed timing of the paper P are detected based on the detection results of sensors 63a and 64a.

The conveyance module 6 controls driving of a conveyance roller (roller prior to registration) 26 and a registration roller 25, and sends the paper P fed from the paper-feed cassette 21a to a secondary transfer area formed between the intermediate transferring belt 30 and the secondary transfer roller 36 at a predetermined timing. To be more specific, the paper P fed from the paper-feed cassette 21a is conveyed by the conveyance roller 26. The conveyed paper P is then stopped at the position once, and after that, the paper P is sent to the secondary transfer area at a predetermined timing. A sensor 67 for detecting the paper P is provided at a position (upstream position) before the registration roller 25.

The fixing module 8 controls a fixing device 40 and fixes the toner image, which is transferred on the paper P in the secondary transfer process. To be more specific, the fixing device 40 includes a pair of fixing rollers 41a and 41b which are pressed with each other by a predetermined pressing force. Between the fixing rollers 41a and 41b, a nip part for nipping and conveying the paper P is provided. The fixing roller 41a includes a halogen heater. The control of the fixing device 40 includes driving control of the fixing rollers 41a and 41b, and on-off control of the halogen heater for keeping a surface temperature of the fixing roller 41a at a predetermined fixing temperature. In the fixing module 8, when the paper P passes through the nip part of the fixing device 40, the toner image on the paper P is heated and pressed to be fixed on the paper P. The paper P passing through the fixing rollers 41a and 41b is discharged to the outside of the fixing roller 40 by an inner discharge roller 44. In the fixing device 40, there is provided a sensor 68 for detecting a passage of the paper P.

The paper discharge module 9 controls driving of a reverse roller 72a and paper discharge rollers 72b and 72c, and discharges the paper P discharged from the fixing device 40, to a face down paper discharge tray 80. On a conveyance path between the discharge roller 72b and the discharge roller 72c, there is provided a sensor 69 for detecting a passage of the paper P.

The both sides copy module 7 is a module for realizing both sides mode in which an image is formed on both sides of the paper P. The both sides copy module 7 controls driving of the reverse roller 72a and a-plurality of paper-refeed rollers 74a to 74d, and refeeds the paper P on one surface of which an image is formed, to the registration roller 25. To be more specific, the paper P on one surface of which an image is fixed by the fixing device 40 is sent in a both sides path by the reverse roller 72a and then conveyed to the registration roller 25 through the both sides path by the paper-refeed rollers 74a to 74d and the conveyance roller 26. Then, the conveyance of the paper P is stopped by the registration roller 25 at the position once and then sent to the secondary transfer area at a predetermined timing. After that, in a similar manner, a toner image is transferred on the other surface of the paper P. In the both sides path, there are provided a plurality of sensors 70 and 71 for detecting a passage of the paper P.

The shared data module 10 is a module for storing information shared among the modules 3 to 9. The modules 3 to 9 can access the shared data module 10 through a communication line 112. Alternatively, the controller module 2 can also access the shared data module 10 through the communication line 112. Information stored in the shared data module 10 will be described below in detail. The controller module 2 issues a print start signal and the issued print start signal is sent to each of the modules 3 to 9 through the communication line 112.

Figure 3:
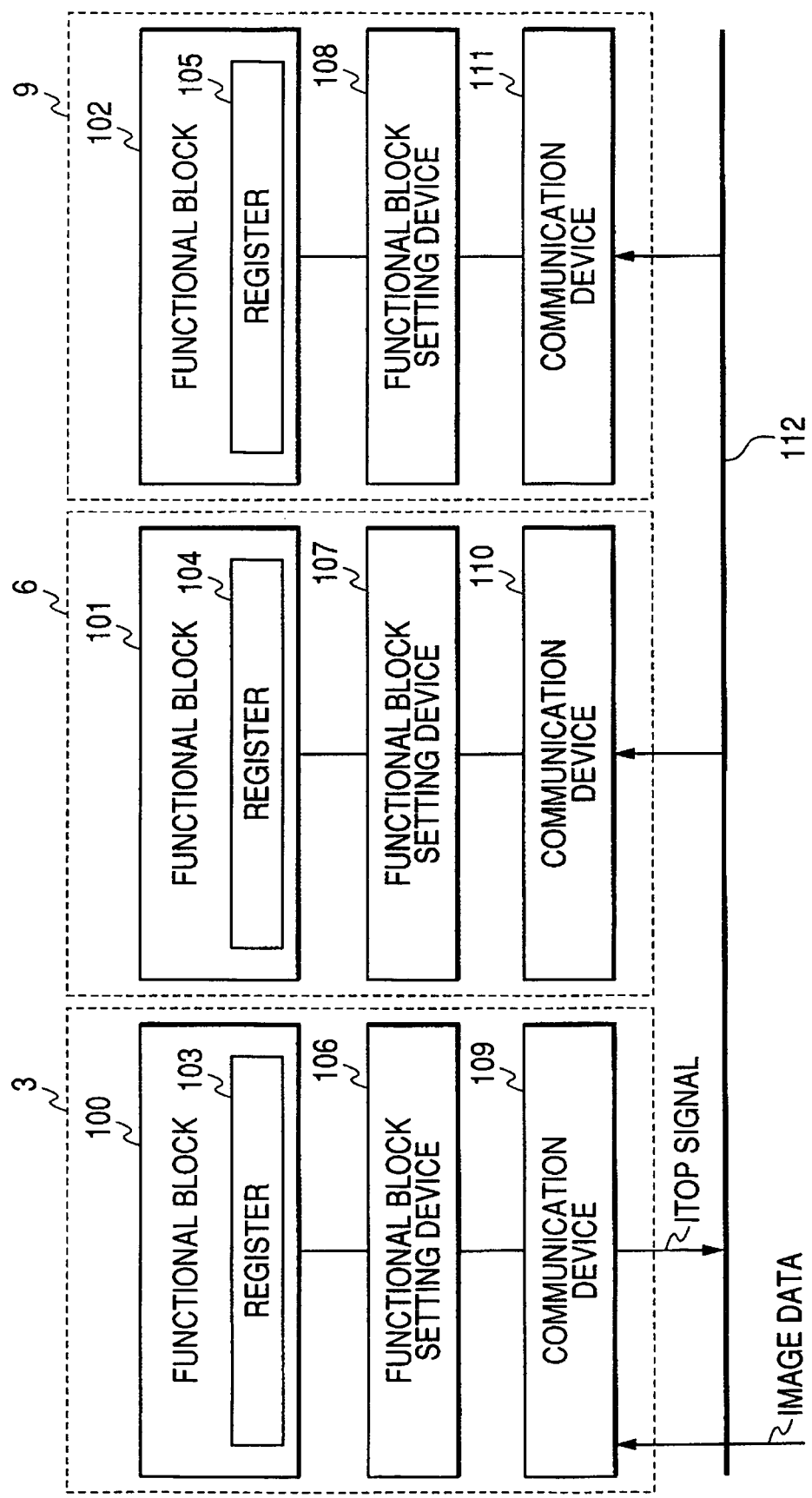
FIG. 3 is a block diagram showing structures of modules 3, 6, and 9 shown in FIG. 1, respectively.

Next, a structure of each of the modules 3 to 9 will be described with reference to FIG. 3. FIG. 3 is a block diagram showing structures of modules 3, 6, and 9 shown in FIG. 1. In this case, example structures of the modules 3, 6, and 9 are described.

The laser module 3 includes, as shown in FIG. 3, a functional block 100, a functional block setting device 106, and a communication device 109. The functional block 100 includes a register 103 constituted by a plurality of registers. Each of the registers 103 holds a plurality of control information required for executing sequence of controlling the scanners 13a to 13d, operation condition information indicative of an operation condition, and the like. The functional block 100 executes the sequence of controlling the scanners 13a to 13d based on the control information of each of the registers 103. Thus, the scanners 13a to 13d emit a laser beam modulated based on image data inputted from the controller module 2 and irradiate the emitted light beam to photosensitive drums 11a to 11d. The functional block 100 also monitors the operation condition of the scanners 13a to 13d and writes the operation condition information indicative of their operation condition into the register 103. The operation condition includes various conditions such as a start of operation, a completion of operation, an occurrence of abnormality of operation, and a malfunction.

The functional block setting device 106 constitutes an interface between the functional block 100 and the communication device 109, and executes, for example, update of control information and read out of operation condition information of each of registers in the register 103. The functional block 100 includes a plurality of registers for storing various control information corresponding to an operation parameter stored in the shared data module 10, and the functional block setting device 106 refers to the above-mentioned operation parameter and operation condition information of other modules 4 to 9 to update control information of each of the registers in the register 103.

The communication device 109 communicates with the controller module 2 and the shared data module 10 through the communication line 112. The communication device 109 transmits the operation condition information of the scanners 13a to 13d read from the functional block setting device 106 to the shared data module 10 through the communication line 112. The communication device 109 also receives information (an operation parameter and operation condition information) read from the shared data module 10 and a print start signal from the controller module 2 through the communication line 112. The communication device 109 also transmits information indicative of an occurrence of abnormality of operation to the controller module 2. The communication device 109 sends to the conveyance module 6 an image top signal (ITOP signal) as an operation reference of the conveyance module 6 through the communication line 112. The communication device 109 receives image data sent from the controller module 2.

The conveyance module 6 includes, similarly to the laser module 3, a functional block 101 including a register 104, a functional block setting device 107, and a communication device 110. The functional block 101 executes the sequence of controlling driving of the conveyance roller (roller prior to registration) 26 and the registration roller 25 based on control values of the register 104. Thus, the paper P fed from the paper-feed cassette 21a is sent to the secondary transfer area between the intermediate transferring belt 30 and the secondary transfer roller 36 at a predetermined timing after passing through the conveyance roller 26 and the registration roller 25. The functional block 101 monitors the conveyance condition (operation condition) of the paper P by the conveyance roller (roller prior to registration) 26 and the registration roller 25 based on output of a sensor 67 to write the operation condition information indicative of the conveyance condition (operation condition) into the register 104.

The functional block setting device 107 constitutes an interface between the functional block 101 and the communication device 110, and executes an update of control information and read out of operation condition information of each of the registers in the register 104. The functional block setting device 107 includes a plurality of registers for storing control information to be updated or the like.

The communication device 110 communicates with the controller module 2 and the shared data module 10 through the communication line 112. The communication device 110 transmits the operation condition information to the shared data module 10 through the communication line 112 and receives information read from the shared data module 10. The communication device 110 also transmits information indicative of an occurrence of abnormality of operation to the controller module 2 through the communication line 112. The communication device 110 also receives an image top signal (ITOP signal) from the laser module 3 through the communication line 112.

The paper discharge module 9 includes, similarly to the laser module 3, a functional block 102 including a register 105, a functional block setting device 108, and a communication device 111. The functional block 102 executes the sequence of controlling driving of the reverse roller 72a and the paper discharge rollers 72b and 72c based on the control information of the register 105. Thus, the fixed paper P discharged from the fixing device 40 is discharged to the face down paper discharge tray 80. The functional block 102 monitors the conveyance condition (operation condition) of the paper P by the conveyance rollers 72a to 72c based on the output of the sensor 69 and then writes the operation condition information indicative of the conveyance condition (operation condition) into the register 105.

The functional block setting device 108 constitutes an interface between the functional block 102 and the communication device 111 and executes an update of control information and read out of operation condition information of each of the registers in the register 104. The functional block setting device 108 includes a plurality of registers for storing control information to be updated or the like.

The communication device 111 communicates with the controller module 2 and the shared data module 10 through the communication line 112. The communication device 111 transmits the operation condition information to the shared data module 10 through the communication line 112 and receives information read from the shared data module 10. The communication device 111 also transmits information indicative of an occurrence of abnormality of operation to the controller module 2 through the communication line 112.

In this case, the structures of each of the modules 3, 6, and 9 are described. However, other modules 4, 5, 7, and 8 are structured in a similar manner, so the description of those modules 4, 5, 7, and 8 will be omitted.

Figure 4:
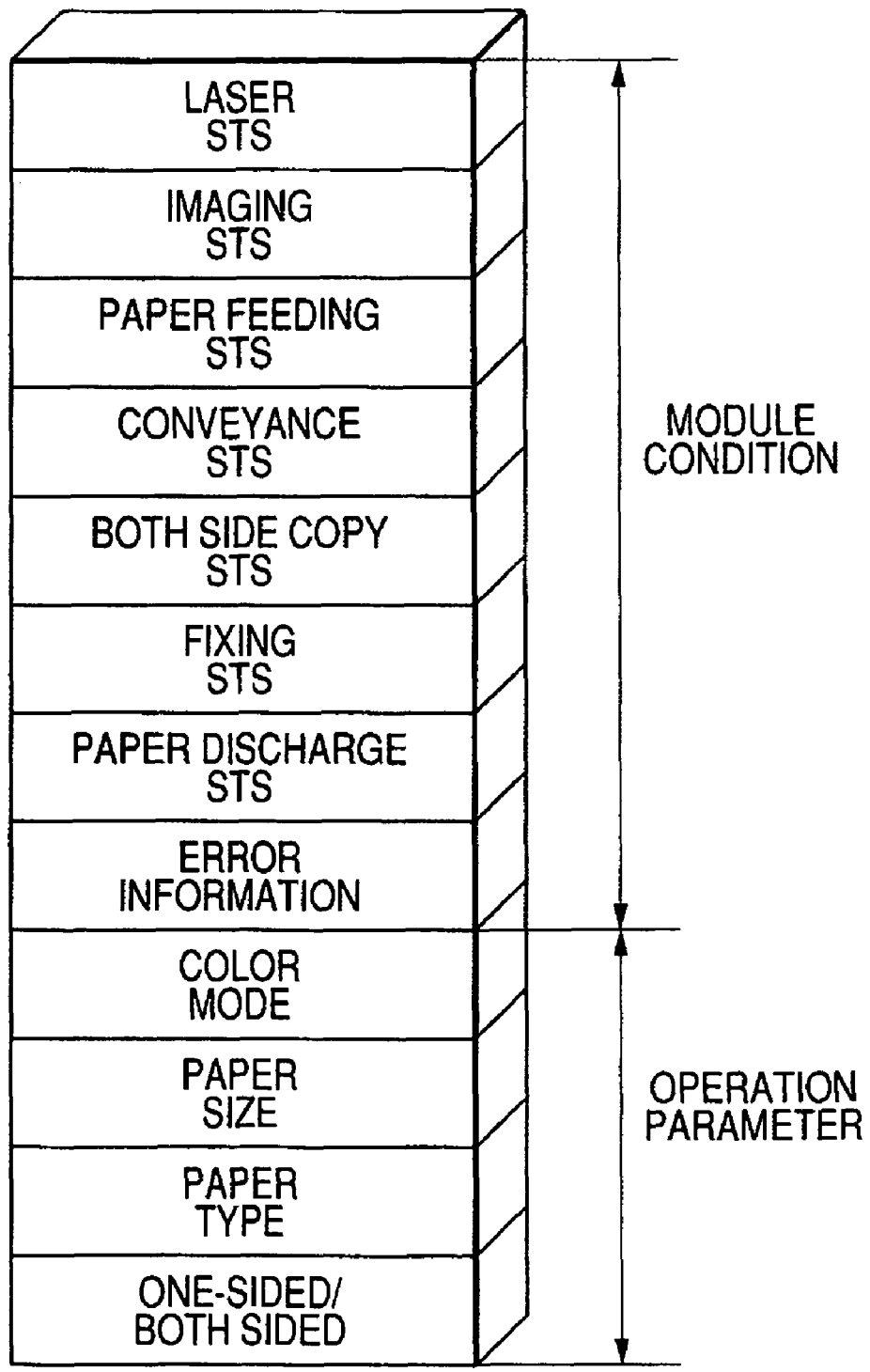
FIG. 4 is a diagram showing an example of an information structure stored in a shared data module 10 shown in FIG. 1.
Figure 5:
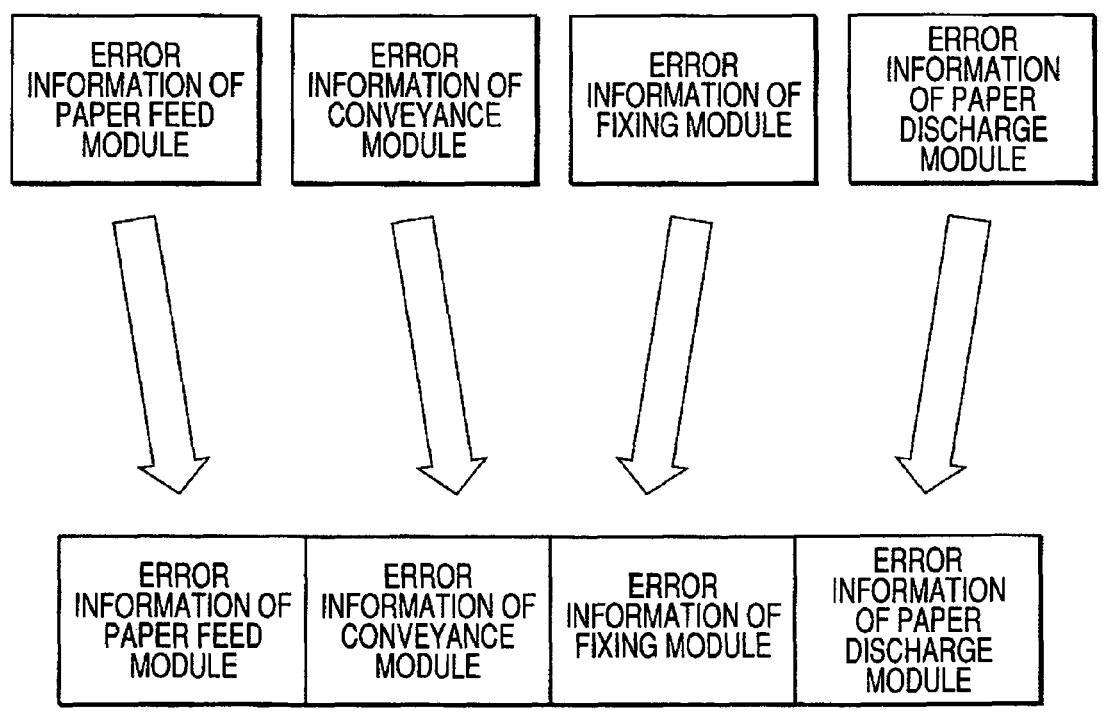
FIG. 5 is a diagram showing a structure of error information stored in the shared data module 10 shown in FIG. 1.

Next, the shared data module 10 will be described with reference to FIGS. 4 and 5. FIG. 4 is a diagram showing an example of an information structure stored in a shared data module 10 shown in FIG. 1 and FIG. 5 is a diagram showing a structure of error information stored in the shared data module 10 shown in FIG. 1.

The shared data module 10 includes, as shown in FIG. 4, an area for storing operation condition information of each of the modules 3 to 9 and an area for storing an operation parameter to be referred to in the whole device. Stored in the area for storing condition of each of the modules 3 to 9 are laser STS indicative of operation condition of the laser module 3, imaging STS indicative of operation condition of the imaging process module 4, paper feed STS indicative of operation condition of the paper-feed module 5, conveyance STS indicative of an operation condition of the conveyance module 6, both side copy STS indicative of condition of the both sides copy module 7, fixing STS indicative of an operation condition of the fixing module 8, paper discharge STS indicative of an operation condition of the paper discharge module 9, and error information of each of the modules 3 to 9, respectively.

In this case, the error information of each of the modules is information generated when an inoperable condition (a condition in which each of the modules cannot migrate to an operable condition) is detected at an initialization operation performed by each of the modules accompanied by power-up of the device. As shown in FIG. 5, the error information of each of the modules is mapped in the same address, and the information can be read at a time. As a result, the controller module 2 learns the condition at the initialization operation of all the modules 3 to 9. For example, when any of the modules 3 to 9 is in an inoperable condition, the controller module 2 displays information for specifying the module which is in the inoperable condition together with the information indicating that an image forming operation is disabled on the operation part.

In the area for storing the operation parameter to be referred to in the whole device, the operation parameters of a color mode, a paper size, a paper type, and one-sided/both-sided are stored.

Figure 6:
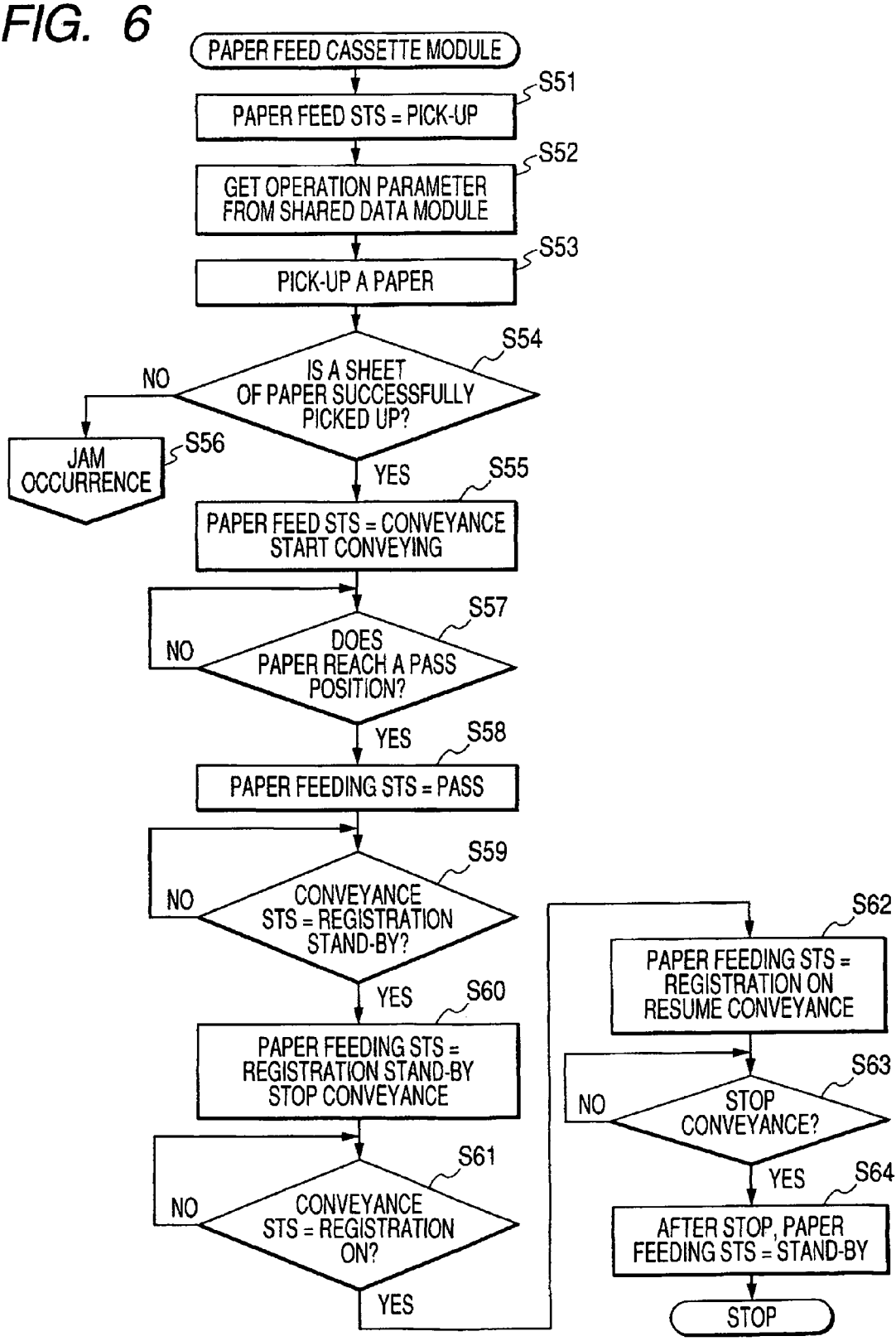
FIG. 6 is a flow chart showing a procedure of an operation of a paper-feed module 5 shown in FIG. 1.
Figure 7:
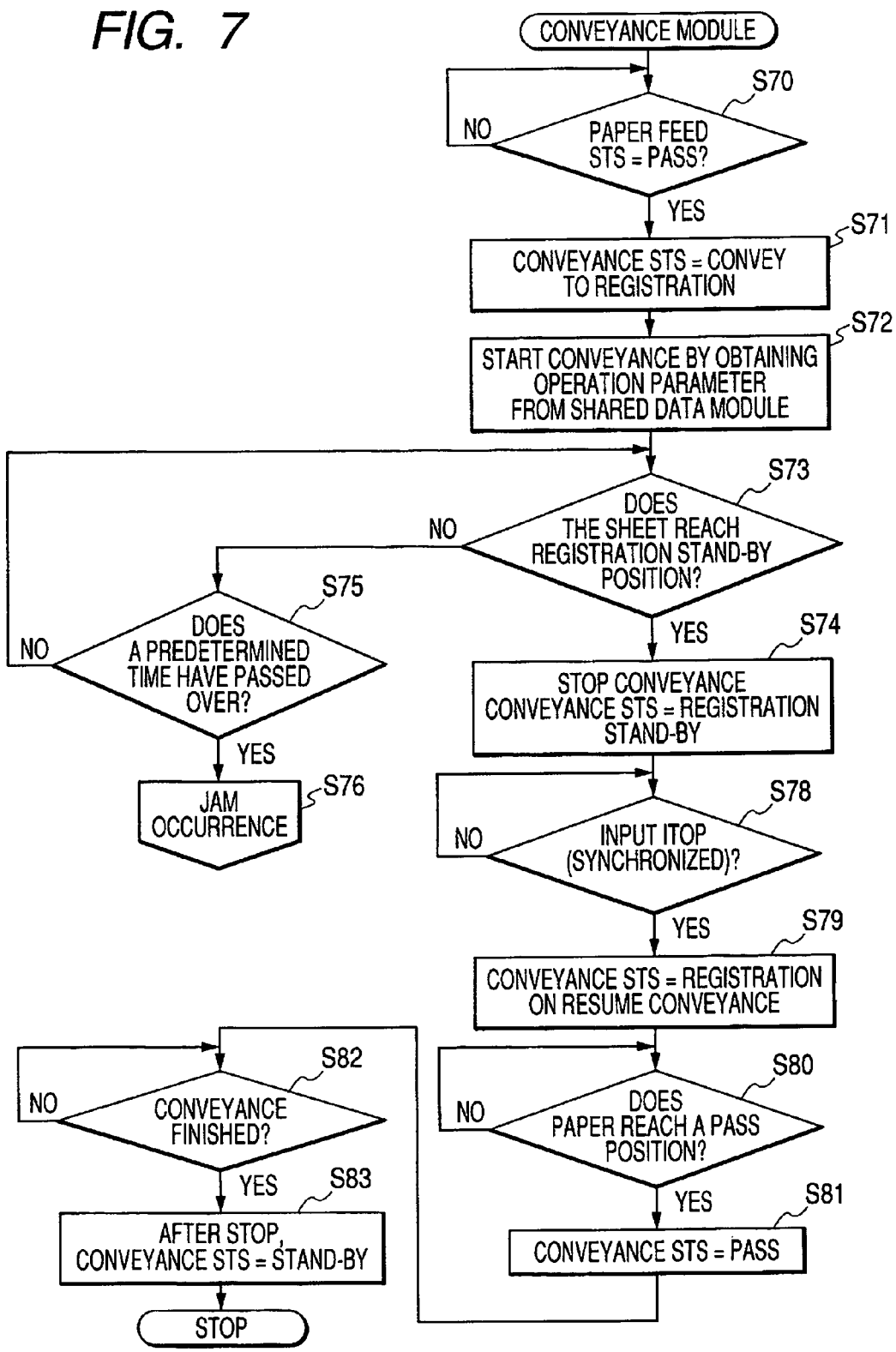
FIG. 7 is a flow chart showing a procedure of an operation of a conveyance module 6 shown in FIG. 1.
Figure 8:
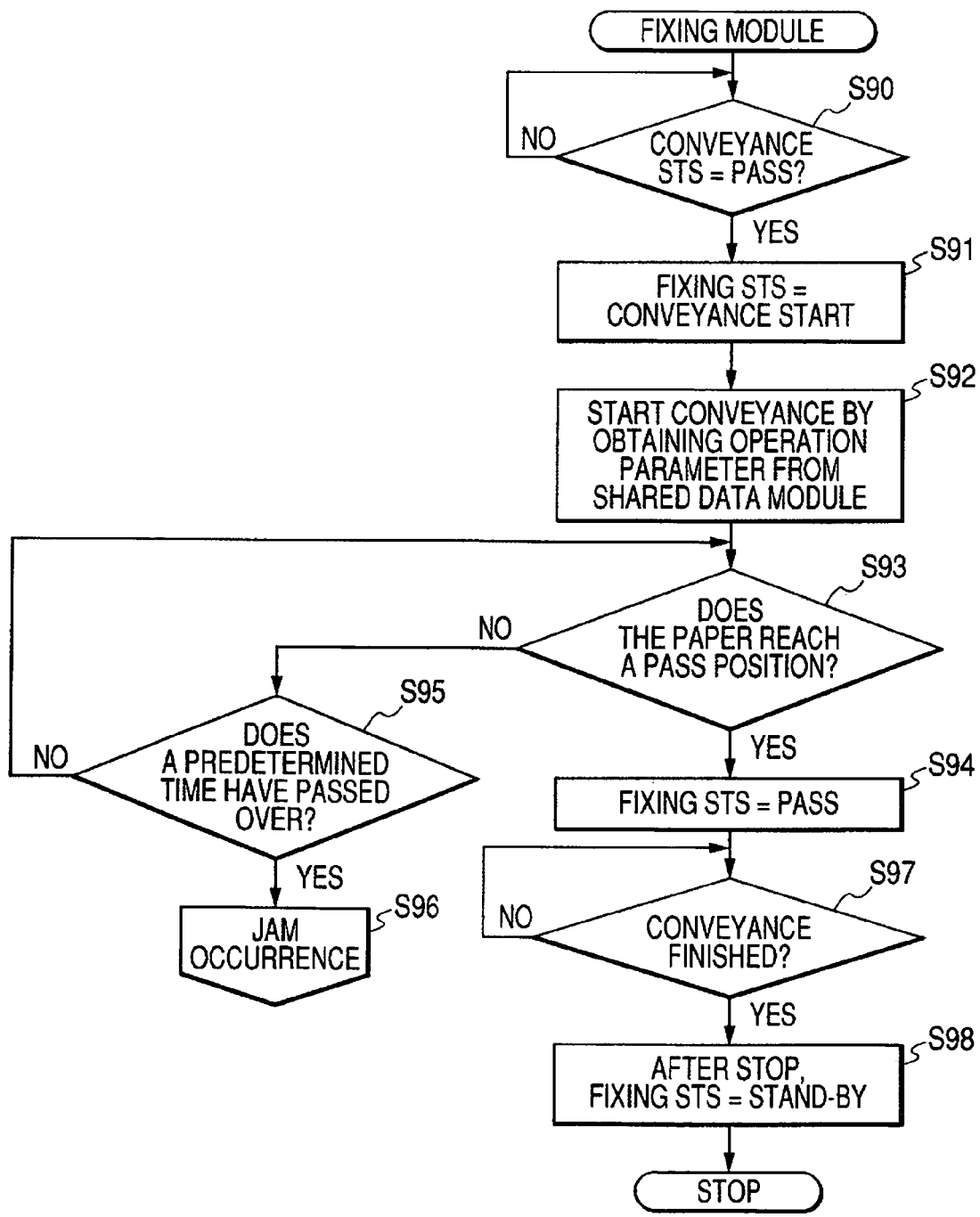
FIG. 8 is a flow chart showing a procedure of an operation of a fixing module 8 shown in FIG. 1.
Figure 9:
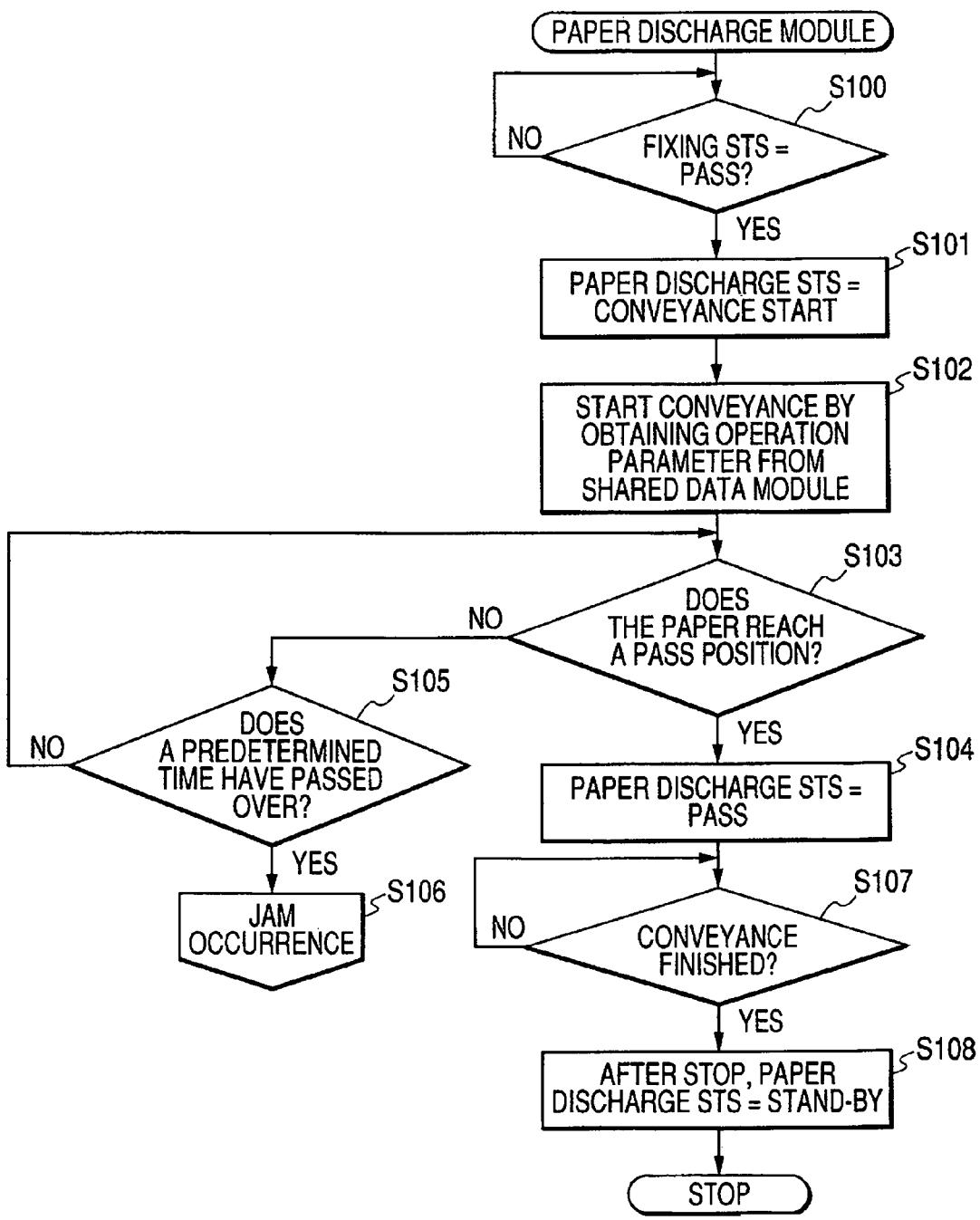
FIG. 9 is a flow chart showing a procedure of an operation of a paper discharge module 9 shown in FIG. 1.

Next, a conveyance operation of the paper P performed by the image forming apparatus according to the present invention will be described with reference to FIGS. 6 to 9. FIG. 6 is a flow chart showing a procedure of the operation of the paper-feed module 5 shown in FIG. 1. FIG. 7 is a flow chart showing a procedure of the operation of the conveyance module 6 shown in FIG. 1. FIG. 8 is a flow chart showing a procedure of the operation of the fixing module 8 shown in FIG. 1. FIG. 9 is a flow chart showing a procedure of the operation of the paper discharge module 9 shown in FIG. 1.

For example, in a case where a full-color image is formed on A4 size paper P, an operation parameter is inputted from an operation part (not shown) or a personal computer, and the inputted parameter is written into the shared data module 10 by the controller module 2. In this example, the operation parameters of the color mode, the paper size, the paper type and one-sided/both-sided are written as the color mode=full-color, the paper size=A4, the paper type=plain paper, and one-sided/both-sided=one-sided. In this case, the case in which the information is written through the controller module 2 is described. However, in a case where only a copy mode is performed, it is also possible to write the operation parameter directly into the shared data module 10 from the operation part.

Next, a start of the image formation is instructed by the operation part or the personal computer, a print start signal is inputted from the controller module 2 to each of the modules 3 to 9 through the communication line 112. Each of the modules 3 to 9 then starts a particular operation.

In the conveyance of the paper P, as shown in FIG. 6, the paper-feed module 5 writes "during pick-up" as the paper feed STS into the shared data module 10 (step S51). Hereinafter, such a condition is simply referred to as the paper feed STS="during pick-up". Then, the paper-feed module 5 obtains the operation parameter from the shared data module 10 (step S52) to start the pick-up operation of the paper P in accordance with the operation parameter (step S53). The pick-up operation is an operation for drawing out the paper P from the cassette 21a for storing paper with the corresponding paper type, one by one, by the pickup roller 22a and a paper-feed roller 23 to convey them to the drawing roller 24.

After that, the paper-feed module 5 determines whether or not the pick-up is successful based on whether or not the paper P is detected by the sensor 64a (step S54). In this case, in a case where the paper P is detected by the sensor 64a, the paper-feed module 5 determines that the pick-up is successful to continue the conveyance operation as the paper-feed STS="conveyance" (step S55). Through the conveyance operation, the paper P is conveyed to the registration roller 25 through the conveyance roller (roller prior to registration) 26. Then, the paper-feed module 5 waits until the paper P reaches a pass position based on an output of the sensor 67 (step S57). In this case, the pass position is a position where an end of the paper is knocked against a nip part of the registration roller 25. When the paper P reaches the pass position, the paper-feed module 5 sets the conveyance STS="pass" (step S58) and waits until the conveyance STS="registration stand-by" is set by the conveyance module 6 (step S59). This is because the conveyance STS="registration stand-by" is set when the end of the paper P is knocked against the registration roller 25. In this case, in the case where the conveyance STS="registration stand-by" is set, the paper-feed module 5 sets the conveyance STS="registration stand-by" to stop conveyance of the paper P once (step S60).

Next, the paper-feed module 5 waits until the conveyance STS of the conveyance module 6 is "registration ON" (step S61). When the conveyance STS is "the registration ON", the paper-feed module 5 sets the paper feed STS="registration ON" to resume the conveyance (step S62). Subsequently, the paper-feed module 5 waits until the conveyance of the paper P by the paper-feed module 5 is finished (step S63), and when the conveyance of the paper P is finished, the paper-feed module 5 sets the paper feed STS="stand-by condition" (step S64). Then, the paper-feed module 5 completes the processing.

In the above-described step S54, when determining that the pick-up is unsuccessful, the paper-feed module 5 judges that a jam has occurred and then performs the corresponding processing (step S56).

The above-described procedure of the operations is the example of the case where a predetermined relationship between a length of the paper P and a conveyance path length is satisfied. Depending on the relation between the length of the paper P and the conveyance path length, other operation procedures different from the above-described procedure may be used.

As shown in FIG. 7, the conveyance module 6 waits until the paper feed STS="pass" is set (step S70). When the paper feed STS="pass" is set, the conveyance module 6 sets the conveyance STS="convey to registration" (step S71). Then, the conveyance module 6 obtains the operation parameter from the shared data module 10 to start the conveyance operation in accordance with the operation parameter (step S72).

Next, the conveyance module 6 determines whether or not the paper P reaches the registration stand-by position (step S73). In this case, if the paper P does not reach the registration stand-by position, the conveyance module 6 determines whether or not a predetermined time has passed since the start of the conveyance operation (step S75). In a case where the predetermined time has not passed since the start of the conveyance operation, the conveyance module 6 determines whether or not the paper P reaches the registration stand-by position again (step S73). In this manner, when the paper P reaches the registration stand-by position before the predetermined time has passed since the start of the conveyance operation, the conveyance module 6 stops conveyance of the paper P once to set the conveyance STS="registration stand-by" (step S74).

Next, the conveyance module 6 waits until the ITOP signal from the laser module 3 is inputted (step S78). When the ITOP signal is inputted, the conveyance module 6 measures a timing of sending the paper P from the registration stand-by position with reference to the ITOP signal (image forming start timing) to start rotation of the registration controller 25 at the measured timing (step S79). At this time, the conveyance module 6 sets the conveyance STS="registration ON". The timing at which the paper P is sent by the registration roller 25 is set so that the paper P matches the full-color toner image primarily transferred on the intermediate transferring belt 30.

In the laser module 3 and the imaging process module 4, when the print start signal is received, the toner image formed on the photosensitive drum 11d, which is at the most upstream in a rotational direction of the intermediate transferring belt 30, by the above-described process, is primarily transferred on the intermediate transferring belt 30 in the primary transfer area by the transfer roller 35d to which a high voltage is applied. The primarily transferred toner image is conveyed to the next primary transfer area. In the next primary transfer area, image formation is performed with a delay which corresponds to the time in which the toner image is conveyed between the photosensitive drums 11a to 11d. The four-color toner image is ultimately superposed on the intermediate transferring belt 30 to be transferred. The full-color toner image is then formed on the intermediate transferring belt 30. After that, the paper P enters the secondary transfer area to contact the intermediate transferring belt 30. At this time, high voltage is applied to the secondary transfer roller 36 at the timing of a passage of the paper P. Then the full-color toner image formed on the intermediate transferring belt 30 is transferred on the paper P.

Next, the conveyance module 6 waits until the paper P reaches the pass position to the fixing module 8 based on the output of the sensor 67 (step S80). When the paper P reaches the pass position, the conveyance module 6 sets the conveyance STS="pass" (step S81). Subsequently, the conveyance module 6 waits until the conveyance of the paper P is finished (step S82). When the conveyance is finished, the operation is stopped to set the conveyance STS="stand-by" (step S83). Then, the conveyance module 6 completes the processing.

In the above-described step S75, the conveyance module 6 determines that a predetermined time has passed before the paper P reaches the registration stand-by position, the conveyance module 6 determines that a jam has occurred to perform the corresponding processing (step S76). The processing will be described later.

As shown in FIG. 8, the fixing module 8 waits until the conveyance STS="pass" is set (step S90). In this case, when the conveyance STS="pass" is set, the fixing module 8 sets the conveyance STS="conveyance start" (step S91). Then, the fixing module 8 obtains the operation parameter from the shared data module 10 to start the conveyance operation in accordance with the operation parameter (step S92).

Next, the fixing module 8 determines whether or not the paper P reaches the pass position to the paper discharge module 9 based on the output of the sensor 68 (step S93). In this case, if the paper P does not reach the pass position to the paper discharge module 9, the fixing module 8 determines whether or not a predetermined time has passed since the start of the conveyance operation (step S95). In a case where a predetermined time has not passed since the start of the conveyance operation, the fixing module 8 determines whether or not the paper P reaches the pass position again (step S93). In this manner, when the paper P reaches the pass position before the predetermined time has passed since the start of the conveyance operation, the fixing module 8 sets the fixing STS="pass" (step S94).

Subsequently, the fixing module 8 waits until the conveyance of the paper P is finished (step S97). When the conveyance is finished, the operation is stopped to set the conveyance STS="stand-by" (step S98). Then, the fixing module 8 completes the processing.

In the above-described step S95, the fixing module 8 determines that a predetermined time has passed before the paper P reaches the above-described pass position, the fixing module 8 determines that a jam has occurred to perform the corresponding processing (step S96).

As shown in FIG. 9, the paper discharge module 9 waits until the fixing STS="pass" is set (step S100). In this case, when the fixing STS="pass" is set, the paper discharge module 9 sets the paper discharge STS="conveyance start" (step S101). Then, the paper discharge module 9 obtains the operation parameter from the shared data module 10 to start the conveyance operation in accordance with the operation parameter (step S102).

Next, the paper discharge module 9 determines whether or not the paper P reaches the pass position to the face down paper discharge tray 80 based on the output of the sensor 69 (step S103). In this case, if the paper P does not reach the above-described pass position, the paper discharge module 9 determines whether or not a predetermined time has passed since the start of the conveyance operation (step S105). In a case where a predetermined time has not passed since the start of the conveyance operation, the paper discharge module 9 determines whether or not the paper P reaches the pass position again (step S103). In this manner, when the paper P reaches the pass position before the predetermined time has passed since the start of the conveyance operation, the fixing module 8 sets the paper discharge STS="pass" (step S104).

Subsequently, the paper discharge module 8 waits until the conveyance of the paper P is finished (step S107). When the conveyance is finished, the operation is stopped to set the paper discharge STS="stand-by" (step S108). Then, the paper discharge module 9 completes the processing.

In the above-described step S105, the paper discharge module 9 determines that a predetermined time has passed before the paper P reaches the pass position, the paper discharge module 9 determines that a jam has occurred to perform the corresponding processing (step S106).

Figure 10:
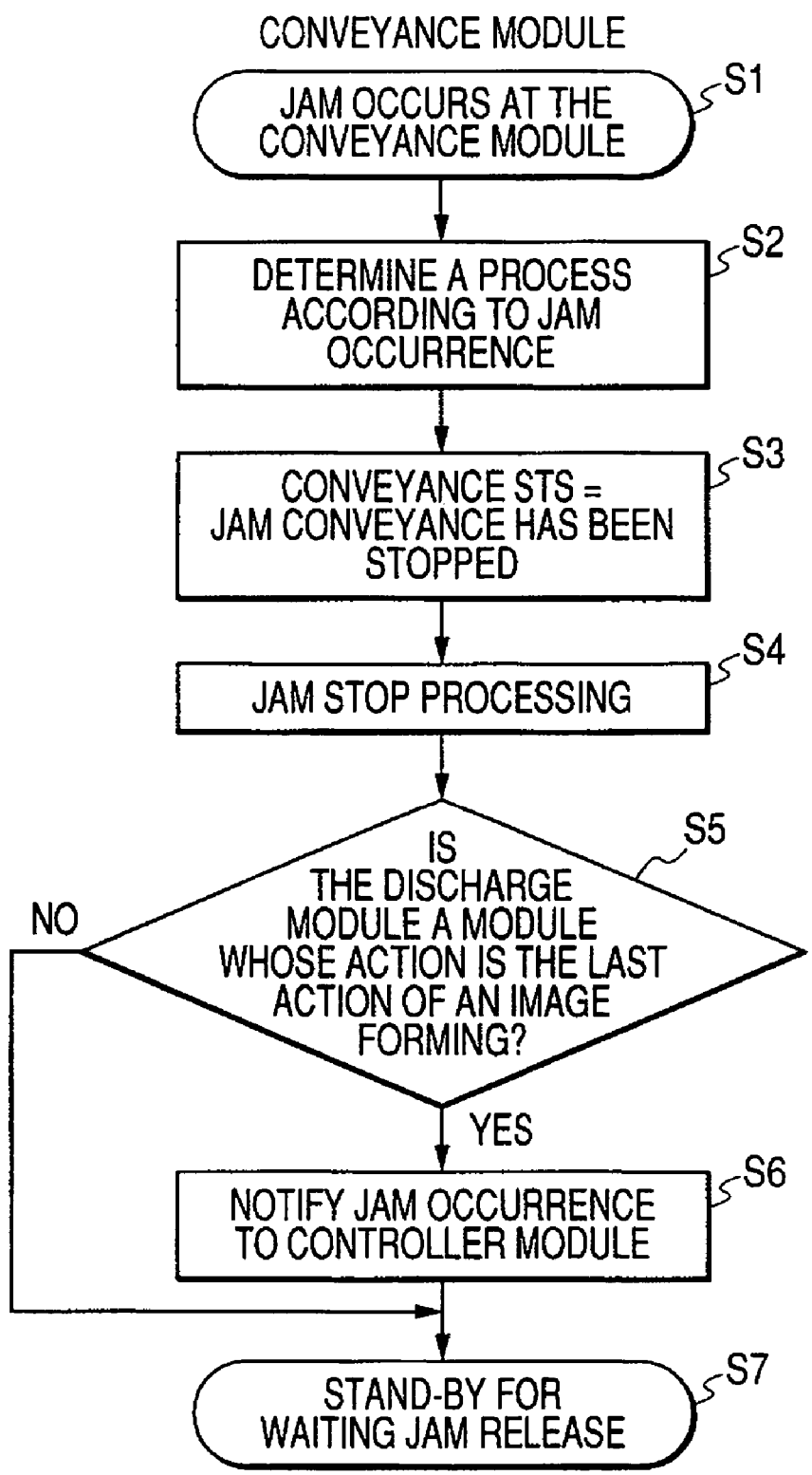
FIG. 10 is a flow chart showing a procedure of an operation of the conveyance module 6 in a case where a jam occurs.

Next, an operation of the conveyance module 6 in a case where a jam occurs will be described with reference to FIGS. 10 and 11. FIG. 10 is a flow chart showing a procedure of an operation of the conveyance module 6 in a case where a jam occurs. FIG. 11 is a diagram showing an example of a table used when processing to be executed in step S2 of FIG. 10 is determined.

As shown in FIG. 10, in a case where a jam occurs at the conveyance module 6 (step S1), the conveyance module 6 refers to the table shown in FIG. 11 to determine the processing to be executed based on the occurred jam type (step S2). Then, the conveyance module 6 sets the conveyance STS="jam conveyance has been stopped" (step S3). Subsequently, the conveyance module 6 performs the processing determined in the above-described step S2 (step S4). In this case, in the table of FIG. 11, an immediate stop is determined as the processing to be executed, and the immediate stop is executed.

Next, the conveyance module 6 refers to the table shown in FIG. 11 to determine whether or not the conveyance module 6 is a module whose operation is the last operation of an image formation (step S5). In this case, in a case where a jam occurs at the conveyance module 6, each of the modules performs the processing set at each of the modules so that each of the modules migrates to the condition for dealing with the occurred jam. Of such modules, the module to finally perform the processing is the last module.

In the above-described step S5, when determining that the conveyance module 6 is a module whose operation is the last operation of an image formation, the conveyance module 6 notifies the controller module 2 of the occurrence of jam (step S6). Upon reception of the notification of the occurrence of jam from the conveyance module 6, the controller module 2 displays a message indicating that a jam occurs at the conveyance module 6 on an operation part (not shown). In this case, in a case of a print output from a personal computer or the like, the controller module 2 notifies the personal computer of the occurrence of jam. Subsequently, the conveyance module 6 stands by in a waiting condition for jam release (step S7).

The above-described step S5, when determining that the conveyance module 6 is not the module whose operation is the last operation of an image formation, the conveyance module 6 skips the above-described step S6 to stand by in the waiting condition for jam release (step S7).

In this case, in the case of this example (the table shown in FIG. 11), when a jam occurs at the conveyance module 6, the conveyance module 6 is not the last module. As a result, the processing of step S6 is skipped without being executed.

As described above, when the conveyance STS="jam conveyance has been stopped" of the conveyance module 6 is set, another module refers to the STS of each of the modules in the shared data module 10 and detects the operation condition of the conveyance module 6, that is, the conveyance STS="jam conveyance has been stopped" to perform the corresponding processing. In other words, when a jam occurs at the conveyance module 6, the paper P at the downstream module of the conveyance module 6 must be used to be discharged to the face down paper discharge tray 80. For the process, the fixing module 8 and the paper discharge module 9 cooperate with each other to perform the operations until the paper P is discharged to the face down paper discharge tray 80. In addition, in this case, the laser module 3, the imaging process module 4, and the paper-feed module 5 migrate to the waiting condition for jam release. For example, the laser module 3 is in the condition of not accepting an input of the image data.

Therefore, referring to the STS of the shared data module 10, another module which has detected an occurrence of jam at any of the modules having a system for conveying the paper P at the paper-feed module 5, the conveyance module 6, the both sides copy module 7, the fixing module 8, and the paper discharge module 9, performs the processing to deal with the occurrence of jam. The processing to deal with the occurrence of jam is determined at each of the modules in accordance with the module in which the jam has occurred and the contents of the jam. In the determination of the processing, the table is used in which the module in which the jam has occurred and the contents of the jam are associated with the processing to be described.

Figure 12:
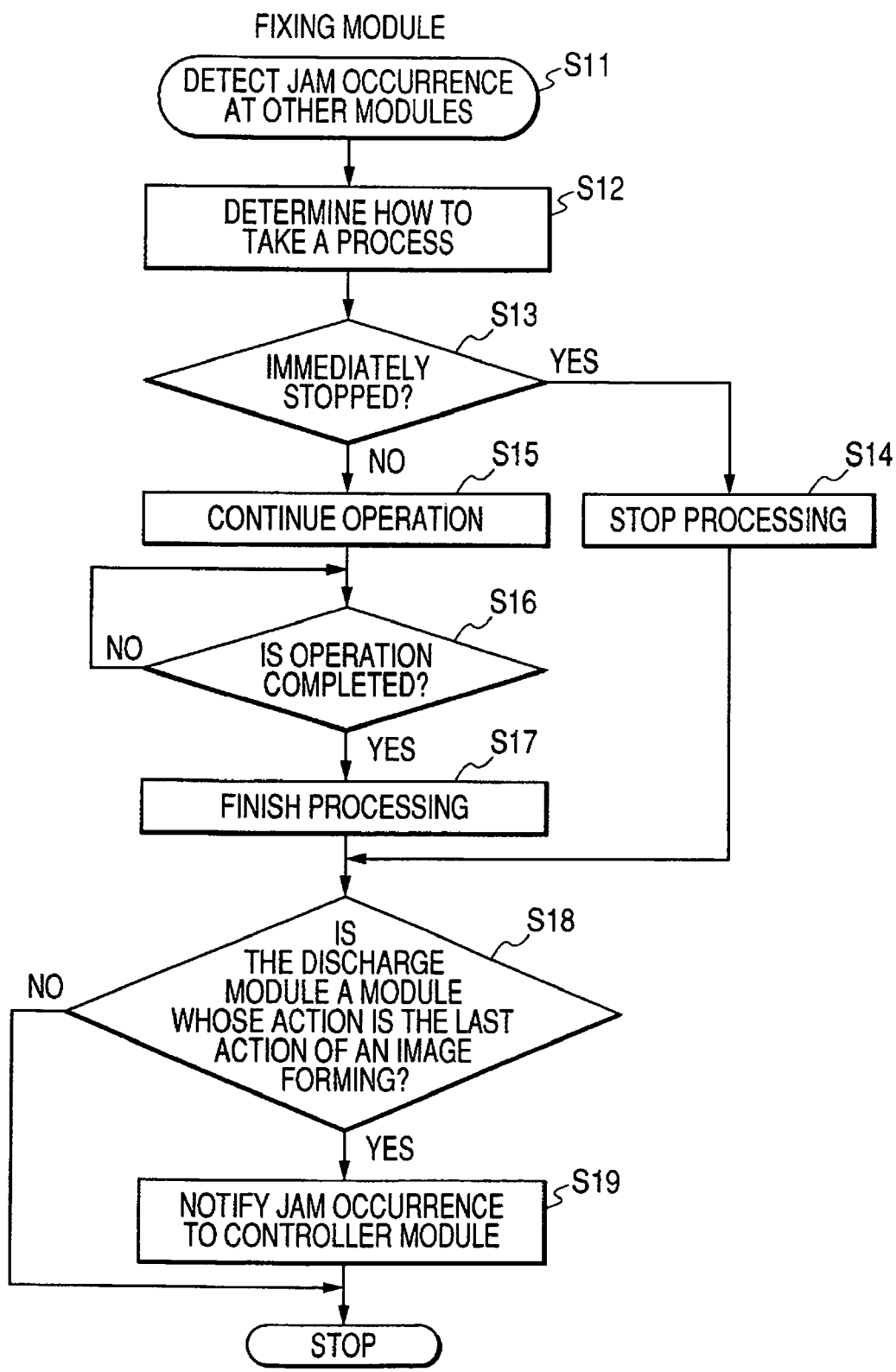
FIG. 12 is a flow chart showing a procedure of an operation of the fixing module 8 in a case where the fixing module 8 detects an occurrence of jam at another module.

For example, an operation in a case where the conveyance module 8 detects an occurrence of jam at another module will be described with reference to FIGS. 12 and 13. FIG. 12 is a flow chart showing a procedure of an operation of the fixing module 8 in a case where the fixing module 8 detects the occurrence of jam at another module. FIG. 13 is a diagram showing an example of a table used when determining the processing to be executed in step S12 of FIG. 12.

As shown in FIG. 12, when detecting the STS="jam stop" of another module (step Sil), the fixing module 8 refers to the table shown in FIG. 13 to determine the processing to be executed based on the information indicating module with occurrence of jam and the occurred jam type (step S12). Then, the fixing module 8 determines whether or not the determined processing is immediate stop processing (step S13). In this case, if the determined processing is the immediate stop processing, the fixing module 8 performs the stop processing (step S14). The fixing module 8 then refers to the table shown in FIG. 13 to determine whether or not the fixing module 8 is a module whose operation is the last operation of an image formation (step S18). As shown in FIG. 13, when a jam occurs, for example, at the conveyance module 6, the fixing module 8 does not correspond to the module whose operation is the last operation of an image formation.

In the above-described step S18, when determining that the fixing module 8 is the module whose operation is the last operation of an image formation, the fixing module 8 notifies the controller module 2 of the module with occurrence of jam (step S19). Upon reception of the notification of the occurrence of jam from the fixing module 8, the controller module 2 displays a message indicative of the occurrence of jam and the module with occurrence of jam on an operation part (not shown). In this case, in case of a print outputted from a personal computer or the like, the controller module 2 notifies the personal computer of the occurrence of jam. Then, the fixing module 8 completes the processing.

On the other hand, when determining that the fixing module 8 is a module whose operation is the last operation of an image formation in step S18, the fixing module 8 skip step S19 to complete the processing.

When determining that the determined processing is not the immediate stop processing, that is, an operation continuation (stop after completion of operation) in step S13, the fixing module 8 continues the operation (step S15) and waits until the operation is completed (step S16) to finish the processing (step S17). Subsequently, the fixing module 8 determines whether or not the fixing module 8 is a module whose operation is the last operation of an image formation (step S18). When determining that the fixing module 8 is a module whose operation is the last operation of an image formation, the fixing module 8 notifies the controller module 2 of the occurrence of jam information (step S19) to complete the processing.

On the other hand, when determining that the fixing module 8 is not a module whose operation is the last operation of an image formation in step S18, the fixing module 8 completes the processing.

For example, when detecting an occurrence of jam at the conveyance module 6 (the conveyance STS="jam conveyance has stopped"), the fixing module 8 determines the stop after completion of operation as the processing to be executed based on the table shown in FIG. 13 (step S12) to finish the conveyance of the paper P in the fixing module 8 (steps S15 to S17). Then, the fixing module 8 is not the module whose operation is the last operation for coping with the occurrence of jam at the conveyance module 6, so the fixing module 8 completes the processing.

Figure 14:
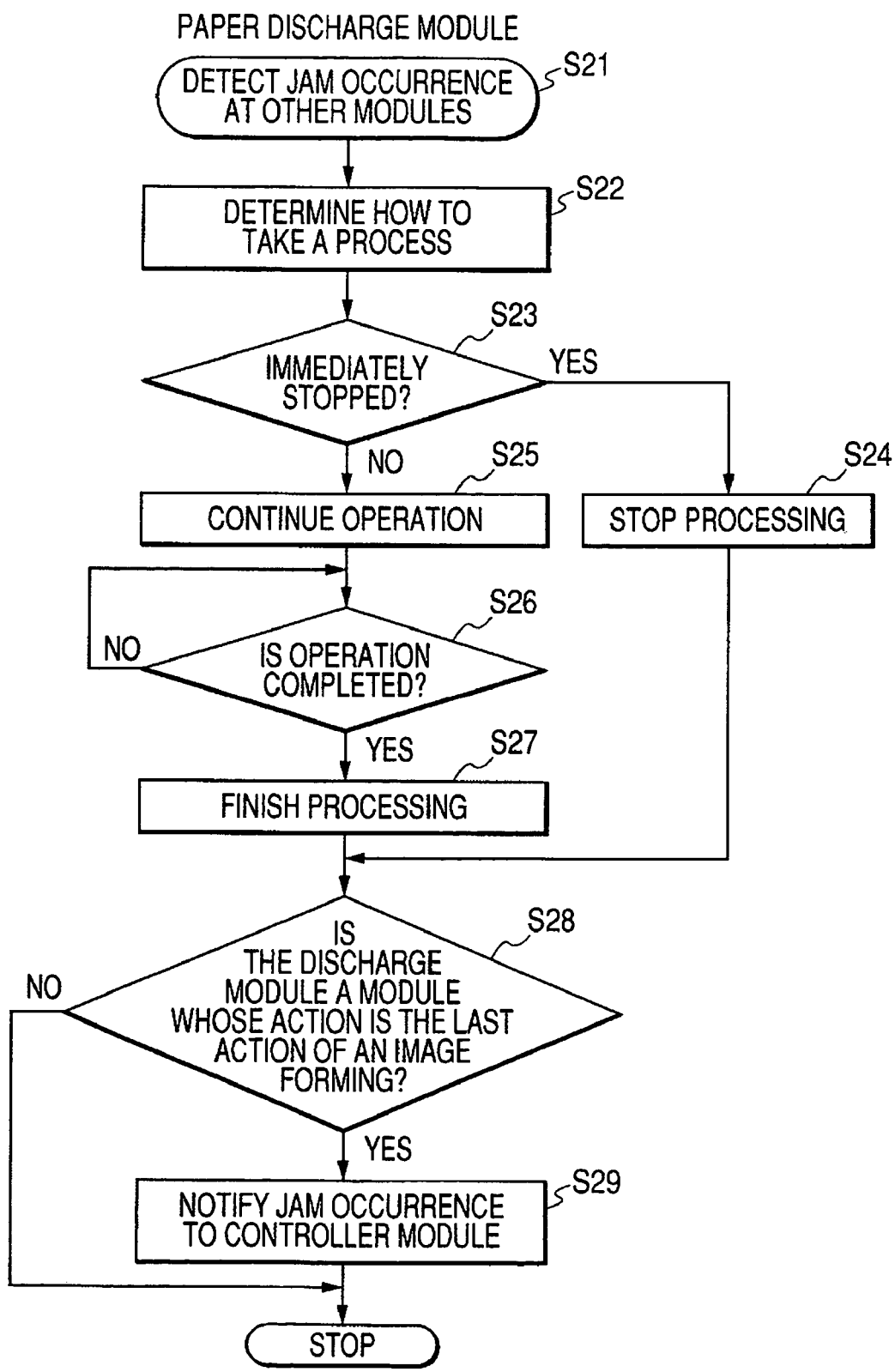
FIG. 14 is a flow chart showing a procedure of an operation of the paper discharge module 9 in a case where a jam occurs at another module.

Next, an operation in a case where the paper discharge module 9 detects an occurrence of jam at another module will be described with reference to FIGS. 14 and 15. FIG. 14 is a flow chart showing a procedure of an operation of the paper discharge module 9 in a case where the paper discharge module 9 detects the occurrence of jam at another module. FIG. 15 is a diagram showing an example of a table used when determining the processing to be executed in step S22 of FIG. 14.

As shown in FIG. 14, when detecting the STS="jam stop" of another module (step S21), the paper discharge module 9 refers to the table shown in FIG. 15 to determine the processing to be executed based on the information indicating module with occurrence of jam and the occurred jam type (step S22). Then, the paper discharge module 9 determines whether or not the determined processing is immediate stop processing (step S23). In this case, if the determined processing is the immediate stop processing, the paper discharge module 9 performs the stop processing (step S24). The paper discharge module 9 then refers to the table shown in FIG. 15 to determine whether or not the paper discharge module 9 is a module whose operation is the last operation of an image formation (step S28). As shown in FIG. 15, when a jam occurs, for example, at the conveyance module 6, the paper discharge module 9 corresponds to the module whose operation is the last operation of an image formation.

In the above-described step S28, when determining that the paper discharge module 9 is the module whose operation is the last operation of an image formation, the paper discharge module 9 notifies the controller module 2 of the module with occurrence of jam (step S29). Upon reception of the notification of the occurrence of jam from the paper discharge module 9, the controller module 2 displays a message indicative of the occurrence of jam and the module with occurrence of jam on an operation part (not shown). In this case, in case of a print outputted from a personal computer or the like, the controller module 2 notifies the personal computer of the occurrence of jam. Then, the paper discharge module 9 completes the processing.

On the other hand, when determining that the paper discharge module 9 is a module whose operation is the last operation of an image formation in step S28, the paper discharge module 9 skips step S29 to complete the processing.

When determining that the determined processing is not the immediate stop processing, that is, an operation continuation (stop after completion of operation) in step S23, the paper discharge module 9 continues the operation (step S25) and waits until the operation is completed (step S26) to finish the processing (step S27). Subsequently, the paper discharge module 9 determines whether or not the paper discharge module 9 is a module whose operation is the last operation of an image formation (step S28). When determining that the paper discharge module 9 is a module whose operation is the last operation of an image formation, the paper discharge module 9 notifies the controller module 2 of the occurrence of jam information (step S29) to complete the processing.

On the other hand, when determining that the paper discharge module 9 is a module whose operation is the last operation of an image formation in step S28, the paper discharge module 9 skips step S29 to complete the processing.

For example, when detecting the occurrence of jam (the conveyance STS="jam conveyance has stopped") at the conveyance module 6, the paper discharge module 9 determines the stop after completion of operation as the processing to be executed based on the table shown in FIG. 15 (step S22) to complete the conveyance of the paper P in the paper discharge module 8 (step S25 to S27). Subsequently, the paper discharge module 9 is the last module which performs the last operation as the processing to deal with the occurrence of jam at the conveyance module 6 (step S28), so the paper discharge module 9 notifies the controller module 2 of the occurrence of jam at the conveyance module 6 (step S29) to complete the processing.

In this case, the operation of the conveyance module 6 in a case where a jam occurs at the conveyance module 6 is explained. However, in a case where a jam occurs at other modules, the same operation is performed. As an example of the abnormality of operation, a jam is explained. However, it is needless to say that other cases of abnormality of operation can also be dealt with in the same manner.

As described above, according to the present embodiment, each of the modules 3 to 9 refers to the operation condition information indicative of the operation parameter and each of the operation conditions of the modules 3 to 9 stored in the shared data module 10, and cooperate with one another to autonomously perform the particular operation which is assigned to perform the image formation. As a result, control associated with image formation is not intensively performed but can be performed in a distributed manner. In addition, consistency can be reliably maintained between the operations performed by each of the modules.

Further, since the operation condition information indicative of the operation condition of each of the modules 3 to 9 is stored in the shared data module 10, the communication for each of the modules to obtain the operation condition of other modules can be simplified.

Furthermore, in a case where an abnormality of operation such as a jam occurs at any of the modules 5 to 9, each of the modules 5 to 9 performs the operation which is not an assigned operation assigned to each of the modules (a particular operation) but is an operation for eliminating the abnormality of operation in accordance with the module at which the abnormality of operation occurs and the contents of the abnormality of operation. Then, in a case where the module is the last module whose operation is the last operation of an image formation, the module notifies the controller module of the occurrence of abnormality of operation. By the processing, even when an abnormality of operation occurs, it makes it possible for each of the modules 5 to 9 to autonomously performs the operation for eliminating the abnormality of operation to be autonomously executed (a particular operation).

Second Embodiment

Figure 16:
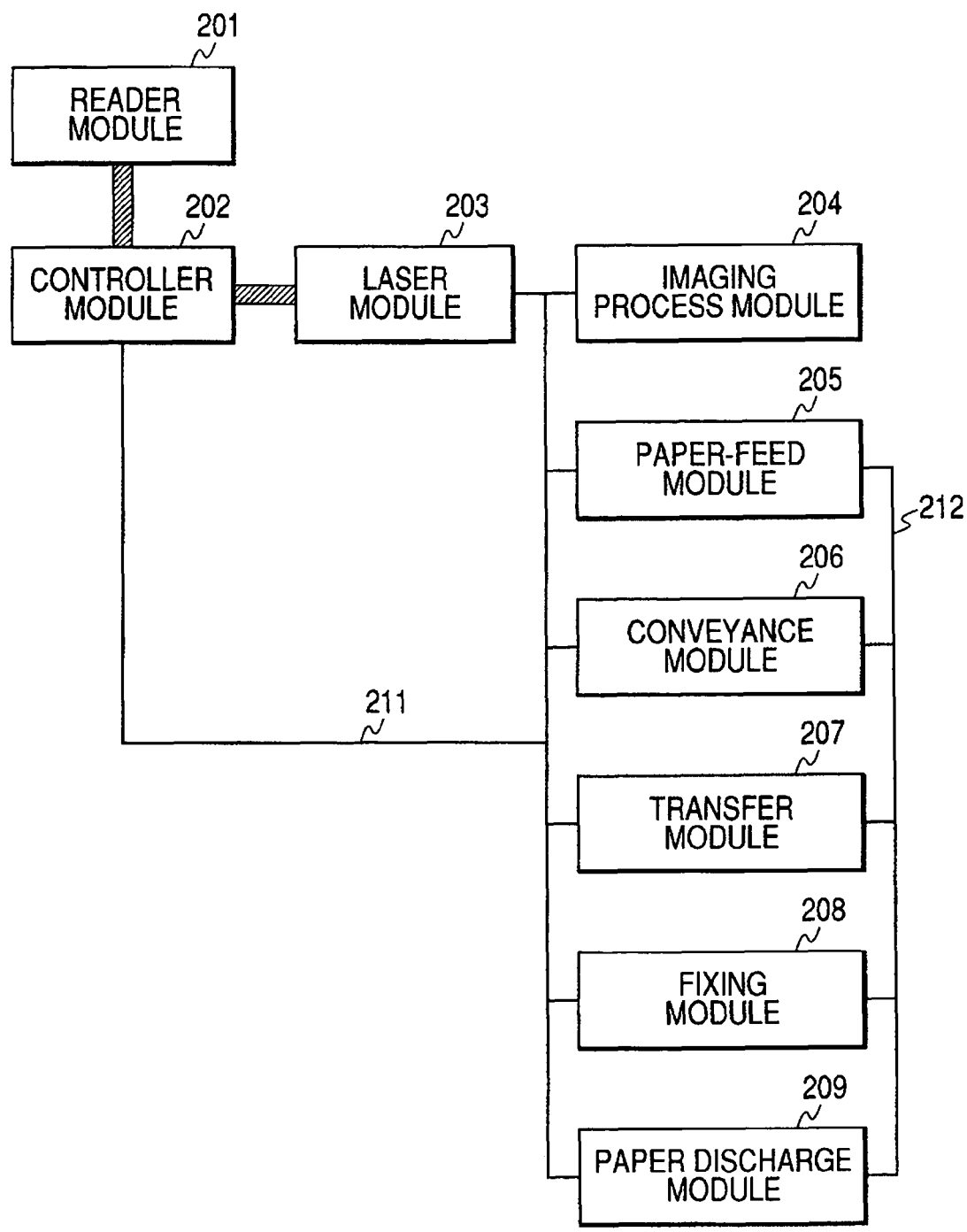
FIG. 16 is a block diagram showing a structure of the image forming apparatus according to a second embodiment of the present invention.

Next, a second embodiment of the present invention will be described with reference to FIG. 16. FIG. 16 is a block diagram showing a structure of the image forming apparatus according to the second embodiment of the present invention.

As shown in FIG. 16, the image forming apparatus includes a reader module 201, a controller module 202, and a plurality of modules 203 to 209 for constituting the printer part. In the same manner as in the first embodiment, a particular operation is assigned to each of the modules 201 to 209 so as to cooperate with one another to perform an image formation. In this case, the operation unit included in each of the modules 203 to 209 is the same operation unit as that of the first embodiment (see FIG. 2).

In the present embodiment, a structure in which an exchange of information is performed through a direct or indirect communication between modules is employed. To be more specific, the controller module 202 is connected to the laser module 203, the imaging process module 204, the paper-feed module 205, the conveyance module 206, the both sides copy module 207, the fixing module 208, and the paper discharge module 209, through the communication line 211. The controller module 202 transmits a print start signal or the like to each of the modules 203 to 209.

The paper-feed module 205, the conveyance module 206, the both sides copy module 207, the fixing module 208, the paper discharge module 209 each notify the module to subsequently execute the operation of the operation through the communication line 212. The module having received the notification starts the particular operation. As described above, in place of referring to the operation condition information stored in the shared data module by each of the modules as in the first embodiment, a mode in which one of the modules notifies the module to subsequently execute the operation of the operation condition among the modules 205 to 209 is employed.

In this case, a case where a full-color image is formed on an A4 size paper conveyed from a cassette is described, for example.

First, the controller module 2 notifies each of the modules of the operation parameter inputted from an operation part (not shown) or a personal computer through the communication line 211. As the operation parameter, for example, the color mode=full-color, the paper size=A4, the paper type=plain paper, and one-sided/both-sided=one-sided are notified. Each of the modules then maintains the operation parameters.

Next, when a start key of the operation part is pressed by a user or a print start is instructed from a personal computer, the print start signal is inputted from the controller module 2 to each of the modules 205 to 209 through the communication line 211. Then, each of the modules 205 to 209 starts the operation.

First, upon reception of the print start signal, the paper-feed module 205 starts a pick-up operation for sending the paper from the cassette. When the paper sent by the pick-up operation is detected by a sensor, the paper-feed module 205 determines that the pick-up is successful to continue the conveyance operation. On the other hand, when the paper sent by the pick-up operation is not detected by the sensor, it is determined that the pick-up is unsuccessful, in other words, a jam occurs. Then, the processing in the case of occurrence of jam is performed.

When the pick-up is successful, by continuing the conveyance operation of the paper-feed module 205, the paper is conveyed to the registration roller and then the end of the paper is knocked against a nip part of the registration roller. Immediately after determining that the pick-up is successful, when the timing of passing the paper to the conveyance module 206 has come, the paper-feed module 205 notifies the conveyance module 206 of the take-over of the operation through the communication line 212 to continue the conveyance operation.

Upon reception of the notification to take over the operation, the conveyance module 206 waits until it is detected that the end of the paper reaches the position of the registration roller. When the end of the paper reaches the position of the registration roller, the conveyance module 206 notifies the paper-feed module 25 through the communication line 212 that the operation condition is the registration stand-by. The paper-feed module 206 notified of the registration stand-by stops the conveyance operation of the paper once.

Subsequently, the paper-feed module 205 waits until the registration ON is notified from the conveyance module 206. When the registration ON is notified, the paper-feed module 205 resumes the conveyance operation. When the paper-feed module 205 determines that it has finished the role as the paper-feed module, the paper-feed module 205 completes the conveyance operation again to migrate to the stand-by condition to wait until the pick-up operation start. In this case, the conveyance module 6 monitors the input of the ITOP signal from the laser module 3 in the stand-by condition to drive the registration roller in synchronization with the ITOP signal. By the processing, the paper stopped at the registration roller position is allowed to be sent to the secondary transfer area in synchronization with the ITOP signal. At the timing of the drive start timing of the registration roller, the registration ON is notified to the paper-feed module 205.

Further, when not detecting that the end of the paper reaches the registration roller position, during a period of time between the receiving time of the notification of the take-over of the operation from the paper-feed module 205 and the time when a predetermined time has passed, the conveyance module 205 determines that a jam has occurred to perform the processing to deal with the occurred jam.

The full-color toner image formed on the immediate transfer belt is transferred to the paper sent to the secondary transfer area to be conveyed to the fixing device of the fixing module 208 by the conveyance module 206. When the paper reaches the pass position of the next fixing module 208, the conveyance module 206 notifies the fixing module 208 of the take-over of the operation through the communication line 212. The conveyance module 206 then waits until the conveyance operation of the conveyance module 206 is finished to thereby complete the conveyance operation. Then, the conveyance module 206 migrates to the stand-by condition to wait for the next conveyance operation.

When being notified of the take-over of the operation from the conveyance module 206, the fixing module 208 performs the operation to fix the full-color toner image on the paper to convey the paper after being fixed to the outside of the fixing device. When the paper reaches the pass position to the paper discharge module 209, the fixing module 208 notifies the paper discharge module 209 of the take-over of the operation through the communication line 212. When the paper discharge module 209 is notified the take-over of the operation from the fixing module 208, the paper discharge module 209 performs the operation for discharging the paper to the face down paper discharge tray.

In such a structure, when a jam occurs at the conveyance module 206, for example, the conveyance module 206 performs a stop processing at the occurrence of jam and at the same time concurrently notifies all the modules of the occurrence of jam in a broadcast through the communication line 212.

Another module notified of the occurrence of jam performs the processing to deal with the occurrence of jam at the conveyance module 206. For example, when being notified of the occurrence of jam at the conveyance module 206, the fixing module 208 refers to the table shown in FIG. 13 to determine the processing to be executed. After executing the determined processing, the fixing module 208 determines whether or not the fixing module 208 is the module whose operation is the last operation by referring to the table shown in FIG. 13. In this case, the fixing module 208 is not the last module for the occurrence of jam at the conveyance module 206 to complete the processing. On the other hand, for example, when the fixing module 208 is the last module for the occurrence of jam at the conveyance module 206, the fixing module 208 notifies the controller module 202 of the occurrence of jam at the conveyance module 206. The controller module 202 displays the occurrence of jam at the conveyance module 206 on the operation part or notifies the personal computer of the occurrence of jam as needed.

The conveyance module 206 in which a jam has occurred refers to the table shown in FIG. 11 to perform the processing corresponding to the occurred jam type. Then, the conveyance module 206 determines whether or not the operation of the conveyance module 206 is the module whose operation is the last operation of the image formation. In the case of the table shown in FIG. 11, the conveyance module 206 is not the last module, so the conveyance module 206 migrates to the jam release stand-by condition. On the other hand, for example, when the conveyance module 206 is the module whose operation is the last operation of the image formation, the conveyance module 206 notifies the controller 202 of the occurrence of jam at the conveyance module 206.

In the present embodiment, the occurrence of jam is notified concurrently to all the modules in a broadcast through the communication line 212. However, the module in which the jam has occurred may notify the occurrence of jam to each of the other modules in turn.

As described above, according to the present embodiment, it is possible to obtain the same effect as that of the first embodiment.

This application claims priority from Japanese Patent Application No. 2005-080495 filed on Mar. 18, 2005, which is hereby incorporated by reference herein.

What is claimed is:

1. An image forming apparatus in which an image is formed by a plurality of image forming operations comprising:
   a plurality of modules each of which has a control section, assigned to perform part of the plurality of image forming operations; and
   a shared data storing device for storing at least operation condition information of each of the plurality of modules,
   wherein each of the control sections of the plurality of modules writes the operation condition information including an occurrence of abnormality into said shared data storing device, wherein each of the control sections of the plurality of modules reads the operation condition information of other modules among said plurality of modules from said shared data storing device, wherein each of the control sections of the plurality of modules performs the assigned image forming operation, and wherein in a case where each of the plurality of modules detects the occurrence of abnormality based on the operation condition information stored in the shared data storing device, each of the plurality of modules performs a particular operation corresponding to the occurrence of abnormality.

2. An image forming apparatus according to claim 1, wherein said plurality of modules each determine the particular operation in accordance with a type of the module in which the abnormality of image forming operation occurs and the contents of the occurred abnormality of image forming operation.

3. An image forming apparatus according to claim 1, wherein said plurality of modules each judge whether or not each of the plurality of modules is the module which executes the last particular operation, after executing the particular operation.

* * * * *